(12) United States Patent
Das et al.

(10) Patent No.: US 11,691,923 B1
(45) Date of Patent: Jul. 4, 2023

(54) HIGH ENTROPY NITRIDE CERAMICS AND METHODS OF SYNTHESIZING THE SAME

(71) Applicants: Suprabha Das, Miami, FL (US); Zhe Cheng, Miami, FL (US); Andriy Durygin, Miami, FL (US)

(72) Inventors: Suprabha Das, Miami, FL (US); Zhe Cheng, Miami, FL (US); Andriy Durygin, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 18/153,512

(22) Filed: Jan. 12, 2023

(51) Int. Cl.
 C04B 35/581 (2006.01)
 C04B 35/58 (2006.01)
 C04B 35/645 (2006.01)
 C04B 35/626 (2006.01)

(52) U.S. Cl.
 CPC ...... C04B 35/581 (2013.01); C04B 35/58014 (2013.01); C04B 35/58028 (2013.01); C04B 35/62695 (2013.01); C04B 35/645 (2013.01); C04B 2235/66 (2013.01); C04B 2235/96 (2013.01)

(58) Field of Classification Search
 CPC ............ C04B 35/581; C04B 35/58014; C04B 35/58028; C04B 35/62695; C04B 35/645; C04B 2235/66; C04B 2235/96
 See application file for complete search history.

(56) References Cited

FOREIGN PATENT DOCUMENTS

CN 110194667 B * 9/2021 ......... C04B 35/5607

OTHER PUBLICATIONS

CN-110194667-B machine translation (Year: 2021).*
Tian Jin et al., Mechanochemical-Assisted Synthesis of High-Entropy Metal Nitride via a Soft Urea Strategy, Advanced Materials, 2018, 30, 1707512, 5 pages.
Dmitry Moskovskikh et al., Extremely hard and tough high entropy nitride ceramics, scientific reports, nature Yesearch, 2020, 8 pages, https://doi.org/10.1038/s41598-020-76945-y.

* cited by examiner

Primary Examiner — Karl E Group
Assistant Examiner — Cameron K Miller
(74) Attorney, Agent, or Firm — Saliwanchik, Lloyd & Eisenschenk

(57) ABSTRACT

Provided are novel high entropy nitrides (HENs) exhibiting excellent physical and chemical properties. Also provided are systems and methods to synthesize bulk HENs by reaction flash sintering. Commercial metal nitride powders can be consolidated into near fully dense single-phase bulk ceramic with a proprietary flash sintering apparatus. A constant DC electrical field of ~80 V/cm and pressure of ~15 MPa at room temperature can trigger reaction flash sintering without pre-heating, and the entire process can finish in ~250 seconds to ~400 seconds.

20 Claims, 37 Drawing Sheets

HIGH ENTROPY NITRIDE CERAMICS AND METHODS OF SYNTHESIZING THE SAME

GOVERNMENT SUPPORT

This invention was made with government support under FA9550-20-F-0005 awarded by the Air Force Research Laboratory. The government has certain rights in the invention.

BACKGROUND

Ceramics that are both hard and tough have a variety of applications such as machining, metal cutting, abrasion, mining as well as structural components in defense, aerospace, and other fields.

In the past decade, research on high-entropy ceramics (HEN) has made progress and drawn interest. High entropy ceramics typically have 4 or more metallic elements randomly occupying the same cation site and one or two nonmetal elements occupying the same anion site. The compositional disorder in the cation sublattice leads to increasing molar configurational entropy and accompanied high-entropy effects such as sluggish diffusion and severe lattice distortion. It can also offer some unique properties due to the entropy stabilization effect.

In related art, ceramics such as carbides, borides, and nitrides often display high hardness but low fracture toughness ($K_{1C}$), which limits their application as structural materials. Recent research on high entropy ceramics has demonstrated that increasing the configurational entropy might improve mechanical properties including fracture toughness. For example, high entropy ceramics like (Ta,Nb,Hf,Ti)C have been reported to display improved hardness as well as fracture toughness than the corresponding binary carbides (i.e., TiC, NbC, HfC TiC) (see Nisar et al., Unveiling enhanced oxidation resistance and mechanical integrity of multicomponent ultra-high temperature carbides, J Am Ceram Soc., 105:2500-2516, https://doi.org/10.1111/jace.18281, 2022; which is hereby incorporated by reference herein in its entirety). This can broaden their applications as structural materials in cutting tools or as wear-resistant coatings.

BRIEF SUMMARY

The synthesis of high entropy nitride according to embodiments of the subject invention can be carried out, for example, through reaction flash sintering. Commercial powders of aluminum nitride (AlN), niobium nitride (NbN), tantalum nitride (TaN), titanium nitride (TiN), and zirconium nitride (ZrN) can be used as the nitride precursors to synthesize sintered high entropy nitride (HEN) ceramics.

Embodiments of the subject invention provide sintered HEN ceramics, comprising $(Al_aNb_aTa_xTi_yZr_z)N$, where a is at least 0.17, x is either 0 or at least 0.17, y is at least 0.16 (e.g., at least 0.32), z is either 0 or at least 0.17, and $2a+x+y+z$ is equal to 1 (or about 1).

In certain embodiments, y is equal to twice a or about twice a, providing compositions with high Ti content. The values of x and z can each, respectively, be equal to a, providing compositions with balanced proportions of Al, Nb, Ta, and Zr. In embodiments where x is 0 (or essentially 0), the sintered HEN ceramic can be synthesized without Ta. In embodiments where z is 0 (or essentially 0), the sintered HEN ceramic can be synthesized without Zr. The value of z can be equal to a, providing compositions with balanced proportions of Al, Nb, and Zr. The value of x can be equal to a, providing compositions with balanced proportions of Al, Nb, and Ta.

Embodiments provide HENs in a five-metal-nitride (5MN) formulation such as $(Al_{0.17}Nb_{0.17}Ta_{0.17}Ti_{0.32}Zr_{0.17})N$, alternatively, a first four-metal-nitride (4MN) formulation such as $(Al_{0.20}Nb_{0.20}Ta_{0.20}Ti_{0.40})N$, and further alternatively a 4MN formulation such as $(Al_{0.20}Nb_{0.20}Ti_{0.40}Zr_{0.20})N$. The mechanical properties of the respective HENs have been characterized, which show high hardness and significantly enhanced fracture toughness compared with their corresponding constituent binary nitrides.

Certain embodiments of the subject invention have been shown to exhibit a Vickers Hardness of at least about 19 gigapascals (GPa) and a fracture toughness of at least about 9 megapascal meters$^{(1/2)}$ (MPa*m$^{(1/2)}$); alternatively a Vickers Hardness of at least about 18 GPa and a fracture toughness of at least about 8 MPa*m$^{(1/2)}$; alternatively a Vickers Hardness of at least about 17 GPa and a fracture toughness of at least about 8 MPa*m$^{(1/2)}$.

Embodiments provide systems and methods for synthesizing a sintered HEN ceramic, in certain embodiments the method comprising: providing a powder comprising $(Al_aNb_aTa_xTi_yZr_z)N$, where a is at least 0.17, x is either 0 or at least 0.17, y is at least 0.32, and z is either 0 or at least 0.17; mixing the powder in an equimolar or near-equimolar ratio to form a reaction mixture where $2a+x+y+z$ is equal to 1 (or about 1); cold-pressing the reaction mixture at a cold-pressing pressure to form a green pellet; inserting the green pellet into an insulating tube; simultaneously applying a voltage (e.g., a direct current (DC) voltage or an alternating current (AC) voltage) and a sintering pressure to the green pellet within the insulating tube, the voltage and the sintering pressure together being sufficient to flash sinter the green pellet, thus synthesizing the sintered HEN ceramic; removing the voltage and the sintering pressure; allowing the sintered HEN ceramic to cool to about ambient temperature; and removing the sintered HEN ceramic from the insulating tube.

In certain embodiments, the cold-pressing can be uniaxial and the cold-pressing pressure can be about 2400 MPa. The DC voltage can be sufficient to produce a DC electrical field of about 80 volts per centimeter (V/cm) across the green pellet. The sintering pressure can be about 14 MPa.

In certain embodiments, the sintered HEN ceramic can comprise $(Al_aNb_aTa_xTi_yZr_z)N$, where a is 0.17, x is 0.17, y is 0.32, and z is 0.17; alternatively, the sintered HEN ceramic can comprise $(Al_aNb_aTa_xTi_yZr_z)N$, where a is 0.20, x is 0.20, y is 0.40, and z is 0; alternatively, the sintered HEN ceramic can comprise $(Al_aNb_aTa_xTi_yZr_z)N$, where a is 0.20, x is 0, y is 0.40, and z is 0.20, while exhibiting a Vickers Hardness of at least 19 GPa (or at least about 19 GPa) and a fracture toughness of at least 9 MPa*m$^{(1/2)}$ (or at least about 9 MPa*m$^{(1/2)}$).

With regard to the values of a, x, y, and z, above, it should be understood that when an embodiments provides two values as being equal, one of ordinary skill in the art is expected to understand the equality is measured in a functional sense with respect to both the relative sensitivity of the provided reactions, and also the accuracy and repeatability of widely used systems and methods of measurement, processing, handling, and delivery. For example, a value of a=0.17 can encompass a range from 0.165 to 0.174. When a constraint such as "$2a+x+y+z=1$" is applied in conjunction with another constraint such as "$a=x=z=(y/2)$" it is understood that, for instance a=0.17, x=0.17, and z=0.17 can be applied with y=0.32 to effectively solve both constraints within the bounds of accuracy available to one of ordinary skill in the art. It is understood that the composition may vary by ±0.005 or about ±0.5%. For example, if the designed composition for one metal is 0.17 or 17%, the actual composition for that metal may be in the range of from 0.165 (or 16.5%) to 0.184 (or 18.4%).

BRIEF DESCRIPTION OF DRAWINGS

FIG. 11B is FIG. 11B is

DETAILED DESCRIPTION

Figure 1:
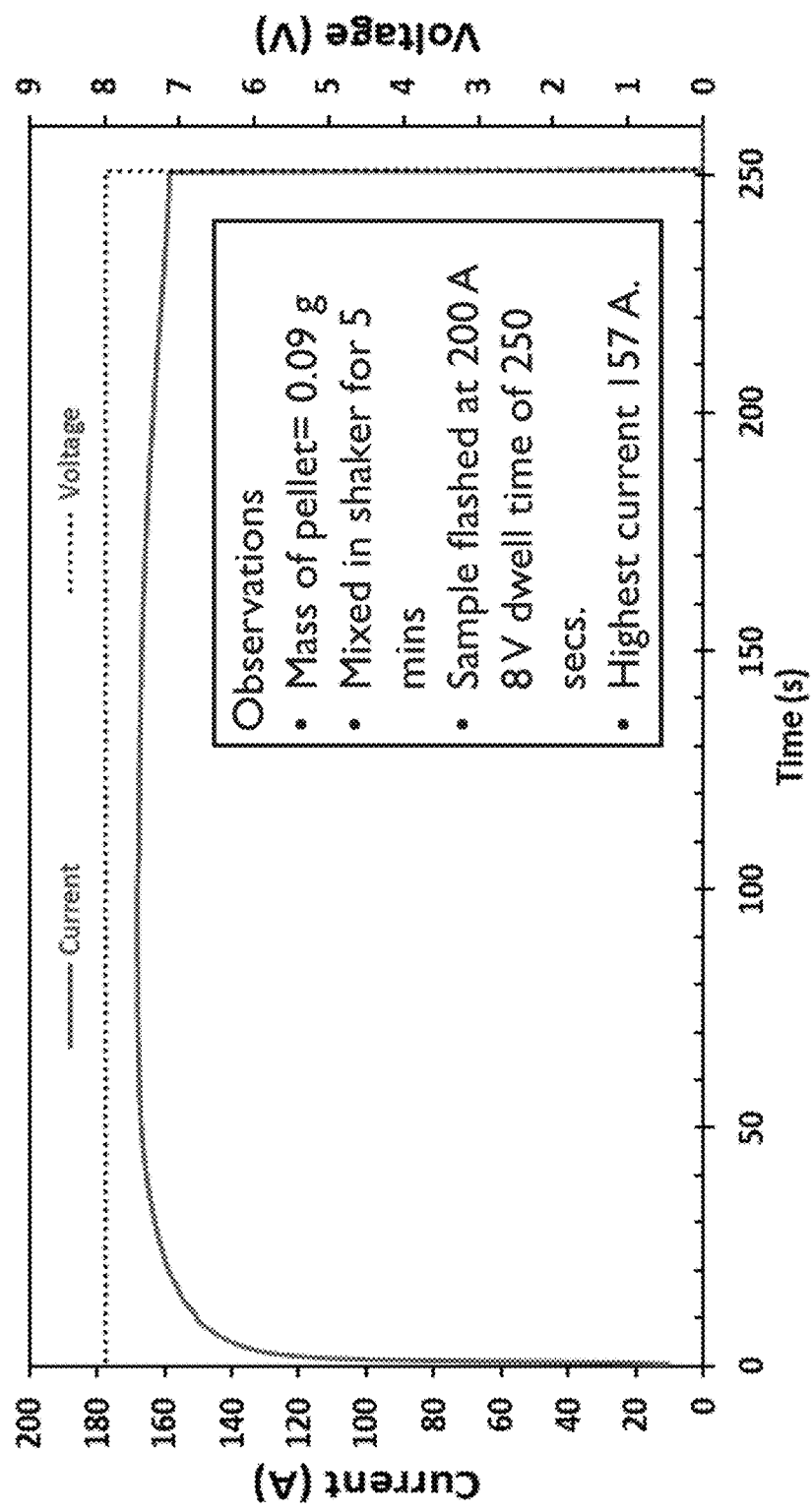
FIG. 1 is a plot of applied voltage and resulting current vs. time for reaction flash sintering of $(Al_{0.17}Nb_{0.17}Ta_{0.17}Ti_{0.32}Zr_{0.17})N$ powder according to an embodiment of the subject invention.

Embodiments of the subject invention provide systems and methods for reaction flash sintering that are useful, for example, to fabricate novel bulk high entropy nitride (HEN) compositions that demonstrate high fracture toughness (significantly higher than the individual nitrides) while maintaining high levels of hardness.

Certain embodiments of the subject invention provide novel compositions of bulk high entropy nitride. The HENs have been synthesized using a proprietary reaction flash sintering apparatus. The fabricated bulk high-entropy nitrides include (Al,Nb,Ta,Ti,Zr)N, (Al,Nb,Ta,Ti)N and (Al,Nb,Ti,Zr)N. Each, respectively, demonstrates high fracture toughness, measured at up to 8.06, 8.22, and 9.09 MPa*m^0.5, respectively. These values are more than double the average value of fracture toughness for the individual binary nitrides.

The provided bulk fabricated high-entropy nitrides show high fracture toughness and high hardness, making them useful for a variety of applications where both high hardness and toughness are required. For comparison, the fracture toughness values for constituting binary nitrides of NbN, TaN, TiN, and ZrN are 2.81, 4.03, 2.2, and 4.6 MPa*m^(1/2), respectively (3.41 MPa*m^(1/2) average value across the four binary nitrides); and the fracture toughness values for constituting binary nitrides of AlN, NbN, TaN, TiN, and ZrN are 2.6, 2.81, 4.03, 2.2, and 4.6 MPa*m^(1/2), respectively (3.25 MPa*m^(1/2) average value across the five binary nitrides.) Embodiments provide fabricated bulk high-entropy nitrides including (Al,Nb,Ta,Ti,Zr)N, (Al,Nb,Ta,Ti)N, and (Al,Nb,Ti,Zr)N that demonstrate fracture toughness up to 8.06, 8.22, and 9.09 MPa*m^(1/2), respectively, which greatly exceed the constituent individual nitrides, as well as other ceramics including high-entropy carbides. The provided materials also maintain high hardness up to 19 GPa. Such high fracture toughness combined with high hardness allows these materials to be useful as structural materials and in coatings for critical mechanical applications.

The transitional term "comprising," "comprises," or "comprise" is inclusive or open-ended and does not exclude additional, unrecited elements or method steps. By contrast, the transitional phrase "consisting of" excludes any element, step, or ingredient not specified in the claim. The phrases "consisting" or "consists essentially of" indicate that the claim encompasses embodiments containing the specified materials or steps and those that do not materially affect the basic and novel characteristic(s) of the claim. Use of the term "comprising" contemplates other embodiments that "consist" or "consisting essentially of" the recited component(s).

When ranges are used herein, such as for dose ranges, combinations and subcombinations of ranges (e.g., subranges within the disclosed range), specific embodiments therein are intended to be explicitly included. When the term "about" is used herein, in conjunction with a numerical value, it is understood that the value can be in a range of 95% of the value to 105% of the value, i.e., the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Example 1: Synthesis of High Entropy Nitride

The inventors were interested in high entropy nitrides and began to synthesize and experiment with them. During this experimentation, the inventors observed the fractured surface of certain HEN samples exhibited layered structures and thus hypothesized certain embodiments might have high fracture toughness similar to other known layered structured hexagonal carbides and nitrides (e.g., $M_{n+1}AX_n$ phases). The fracture toughness values were measured, and initial results were found to be advantageously high.

This example provides systems and methods for the synthesis of a family of high-entropy nitrides such as $(Al_{0.17}Nb_{0.17}Ta_{0.17}Ti_{0.32}Zr_{0.17})N$, $(Al_{0.20}Nb_{0.20}Ta_{0.20}Ti_{0.40})N$, and $(Al_{0.20}Nb_{0.20}Ti_{0.40}Zr_{0.20})N$. The mechanical properties of the respective HENs have been characterized, which show high hardness and significantly enhanced fracture toughness compared with their corresponding constituent binary nitrides.

Experimental Procedure

The synthesis of high entropy nitride was carried out through reaction flash sintering. Commercial powders of aluminum nitride (AlN), niobium nitride (NbN), tantalum nitride (TaN), titanium nitride (TiN), and zirconium nitride (ZrN) were used as the nitride precursors to synthesize high entropy nitride ceramics. All individual nitrides were mixed in equimolar ratios and shaker ball mixed for five minutes to ensure homogeneity. It is contemplated within the teachings of the subject invention that the compositions can be optimized further to obtain one or more improved properties. Equimolar or near-equimolar nitride powders were mixed in a Spex shaker mixer/mill (SPEX 8000 mixer/mill) for 5 mins. Three compositions were formed, including HEN01 for $(Al_{0.17}Nb_{0.17}Ta_{0.17}Ti_{0.32}Zr_{0.17})N$, HEN02 for $(Al_{0.20}Nb_{0.20}Ta_{0.20}Ti_{0.40})N$, and HEN03 for $(Al_{0.20}Nb_{0.20}Ti_{0.40}Zr_{0.20})N$.

Reaction flash sintering was performed with each of the shaker mixed powders. A proprietary apparatus was used (see: Das S, et al. Synthesis and flash sintering of zirconium nitride powder. *J Am Ceram Soc.* 2022; 105(6):3925-3936. doi.org/10.1111/jace.18421; Belisario J, et al. Synthesis and flash sintering of (Hf1-xZrx)B2 solid solution powders. *J Eur Ceram Soc.* 2021; 41(4):2215-2225.//doi.org/10.1016/ j.jeurceramsoc.2020.12.015; and Mondal S, et al. Multicomponent bulk metal nitride (Nb1/3Ta1/3Ti1/3)N1-δ synthesis via reaction flash sintering and characterizations. *J Am Ceram Soc.* 2020; 103(9):4876-4893. doi.org/10.1111/jace.17226; each of which is respectively hereby incorporated by reference in its entirety, including all figures and tables, to the extent they are not inconsistent with the explicit teachings of this specification)

Around 90 mg of each respective powder mixture was uniaxially cold-pressed (pressure up to ~2400 MPa) to form cylindrical pellets with a diameter of 3.1 mm and thickness of ~1 mm. Pressing the powder forms a compact green body and facilitates the flash sintering process. Each respective pellet was inserted into a hexagonal boron nitride (h-BN) tube (inner diameter of 3.1 mm, an outer diameter of 6 mm, and height of 15 mm). Two graphite rods (each with a diameter of 3.1 mm and height of 7.5 mm) served as electrodes to pass the electric current directly through the pellet, which is contained inside the insulating h-BN tube. External structures provide mechanical support and thermal insulation. A constant DC voltage of 8 V (corresponding to a DC electrical field of ~80V/cm for ~1 mm thick green samples) and a constant pressure of 14 MPa was applied between the two graphite electrodes. The flash occurred without external pre-heating. The entire process at constant voltage was completed between 250 seconds and 400 seconds for each respective sample (including one formulation of 5MN, two formulations of 4MN, and each of 5 different constituent nitride samples prepared.) Then the power was shut off and the system was allowed to cool down naturally to room temperature.

Materials Characterization

The flash sintered pellets were ground and polished for characterization. X-ray diffraction (XRD) patterns were collected by a Siemens D5000 diffractometer with Cu-Kα radiation ($\lambda$=1.541874 Å). The microstructure and energy dispersive X-Ray spectroscopy (EDX) of the flash sintered pellets was analyzed under a scanning electron microscope (SEM JEOL JSM-F100). The sintered pellets were also mounted in epoxy, polished, and tested for Vickers hardness and fracture toughness using a LECO LM810AT Microindentation Hardness Tester (LECO Corporation). The indentation was performed with a diamond tip at a load of about 2000 gf (about 19.7N). The test was repeated along the diameter to ensure accuracy of the result. Cracks from the indentations were then observed using SEM. The crack lengths were measured to calculate fracture toughness using the formula $K_{1c}$=0.016 $(E/H)^{0.5}(P/c^{1.5})$ in units of MPa·m$^{1/2}$, where E is the elastic modulus, H is the hardness, P is the indentation load and c is the crack length.

Results

FIG. 1 shows the current and voltage vs. time plot for flash sintering of shaker mixed 5-metal nitride (5MN). Under constant DC voltage, current through the sample first increased very quickly representing the flash phenomenon. Voltage then increased gradually until reaching a maximum value, and the power stabilized.

Figure 2A:
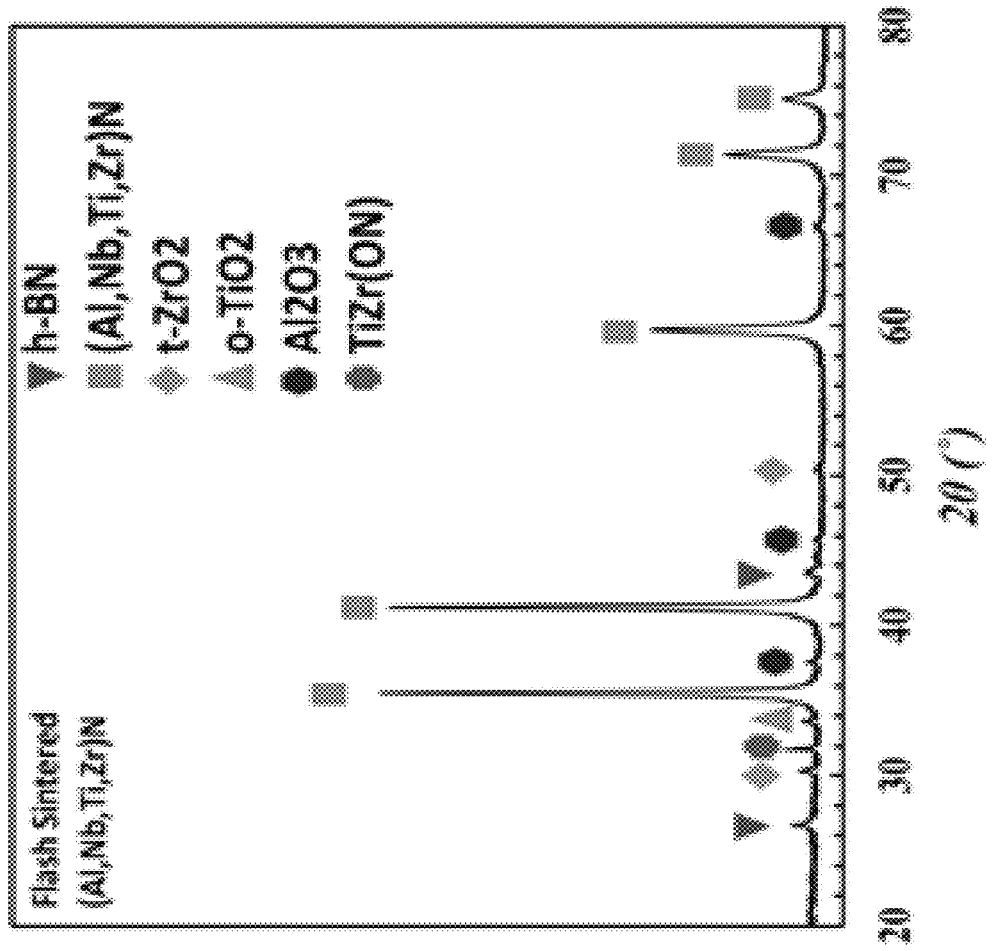
FIG. 2A illustrates the X-Ray Diffraction (XRD) pattern for sample HEN01 comprising $(Al_{0.17}Nb_{0.17}Ta_{0.17}Ti_{0.32}Zr_{0.17})N$ synthesized using reaction flash sintering according to an embodiment of the subject invention.
Figure 2B:
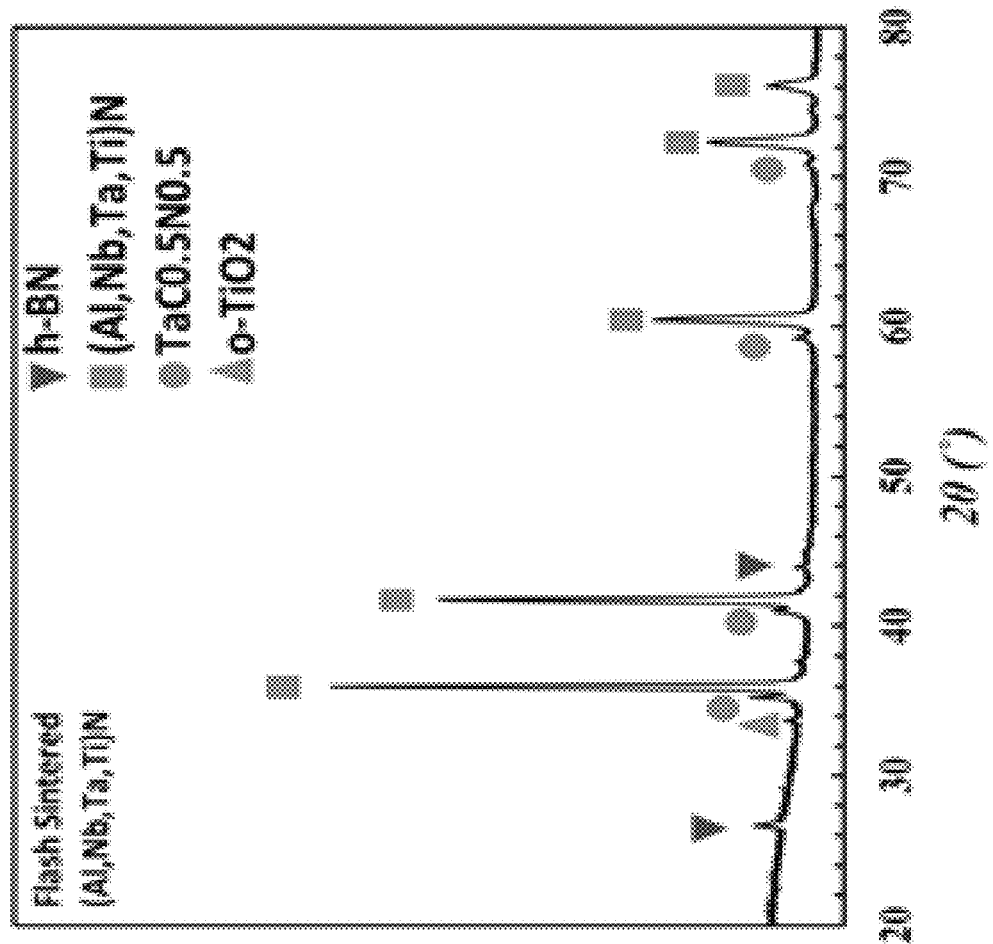
FIG. 2B illustrates the XRD pattern for sample HEN02 comprising $(Al_{0.20}Nb_{0.20}Ta_{0.20}Ti_{0.40})N$ synthesized using reaction flash sintering according to an embodiment of the subject invention.
Figure 2C:
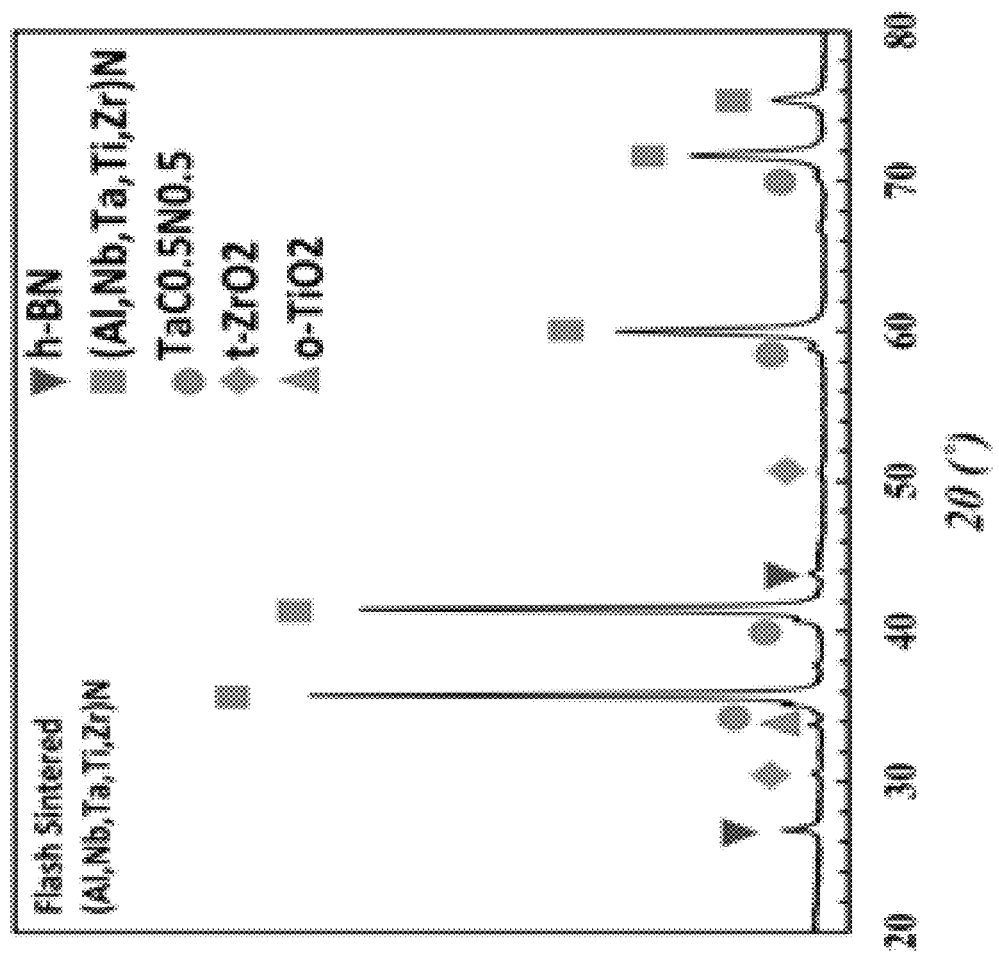
FIG. 2C illustrates the XRD pattern for sample HEN03 comprising $(Al_{0.20}Nb_{0.20}Ti_{0.40}Zr_{0.20})N$ synthesized using reaction flash sintering according to an embodiment of the subject invention.

The XRD pattern for the flash sintered samples for each of three compositions are shown in FIGS. 2A-2C, respectively. Sharp and intense diffraction peaks corresponding to cubic NaCl like crystal structure are observed. There is no obvious peak splitting, but there are minor peaks corresponding to oxide impurities from commercial nitride precursors (e.g., $ZrO_2$ in ZrN). The obtained XRD peaks show that single phase high entropy nitride solid solutions have been synthesized. The lattice parameter obtained from the XRD pattern is 4.364 Å for HEN01 5MN $(Al_{0.17}Nb_{0.17}Ta_{0.17}Ti_{0.32}Zr_{0.17})N$, 4.331 Å for HEN02 4MN $(Al_{0.20}Nb_{0.20}Ta_{0.20}Ti_{0.40})N$, and 4.381 Å for HEN03 4MN $(Al_{0.21}Nb_{0.20}Ti_{0.40}Zr_{0.20})N$.

Figure 3A:
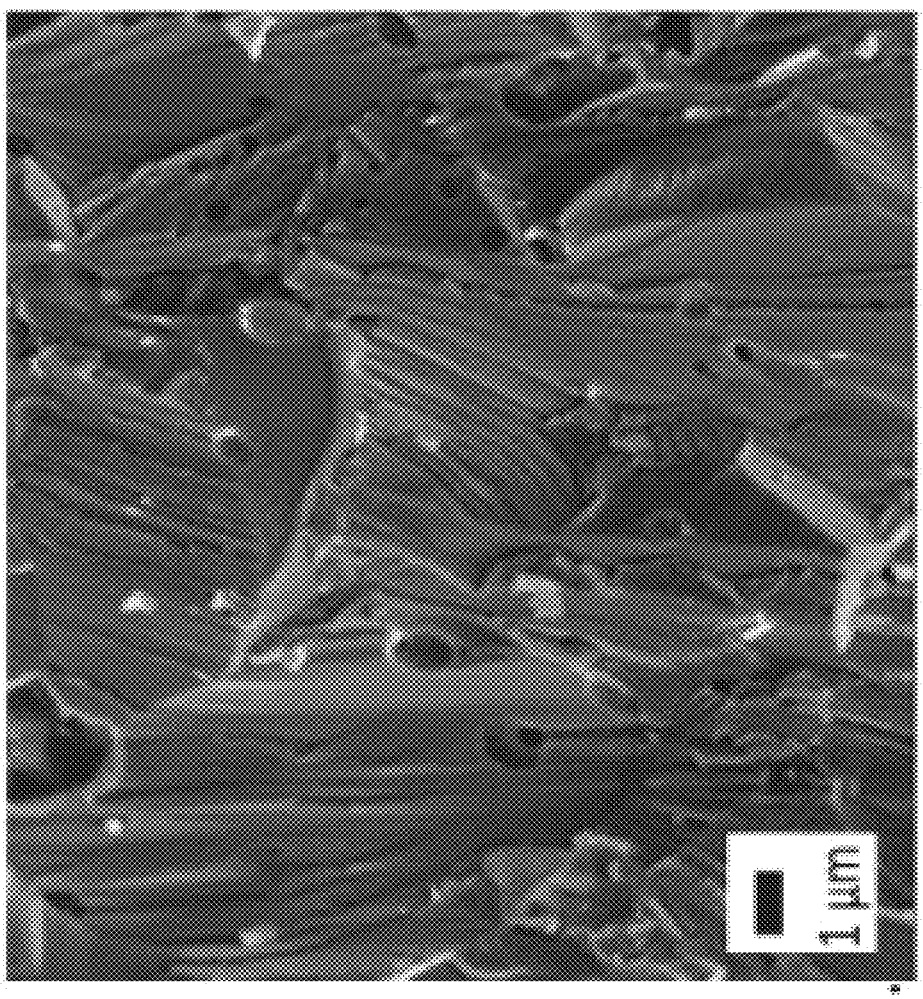
FIG. 3A is a scanning electron microscope (SEM) image of a fractured surface of bulk flash sintered sample HEN01 comprising $(Al_{0.17}Nb_{0.17}Ta_{0.17}Ti_{0.32}Zr_{0.17})N$ synthesized using reaction flash sintering according to an embodiment of the subject invention.
Figure 3B:
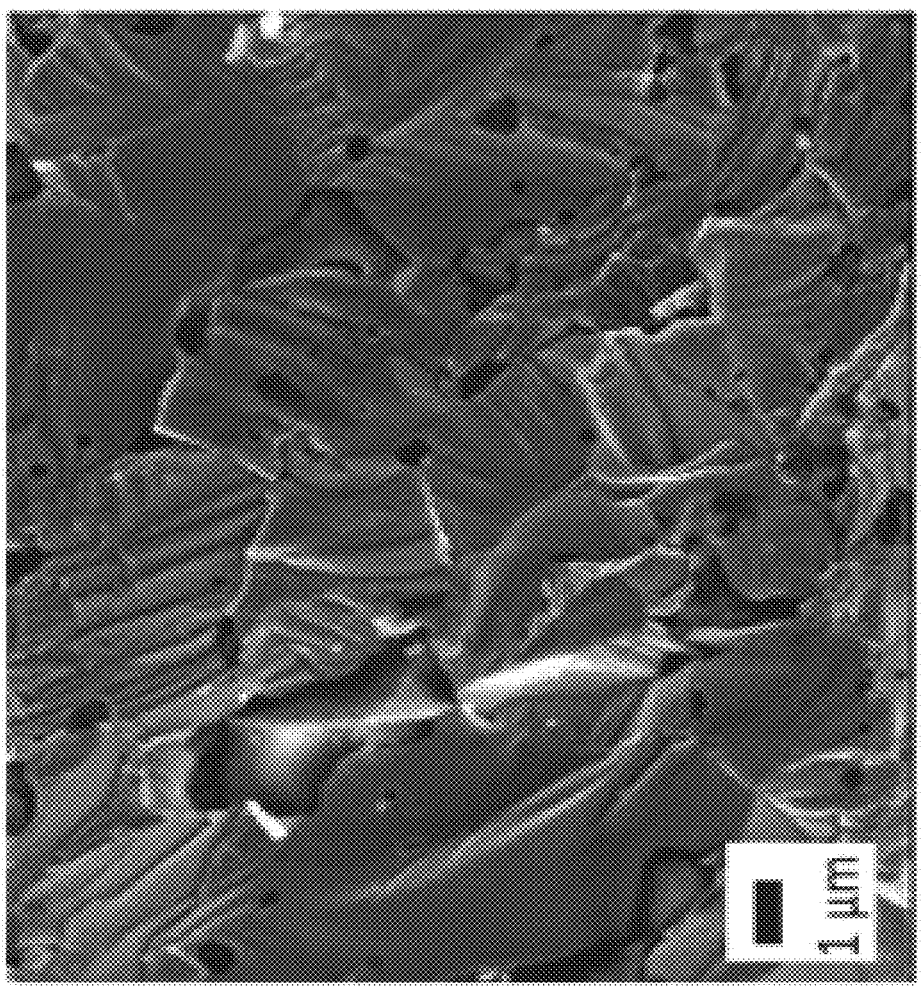
FIG. 3B is an SEM image of a fractured surface of bulk flash sintered sample HEN02 comprising $(Al_{0.20}Nb_{0.20}Ta_{0.20}Ti_{0.40})N$ synthesized using reaction flash sintering according to an embodiment of the subject invention.
Figure 3C:
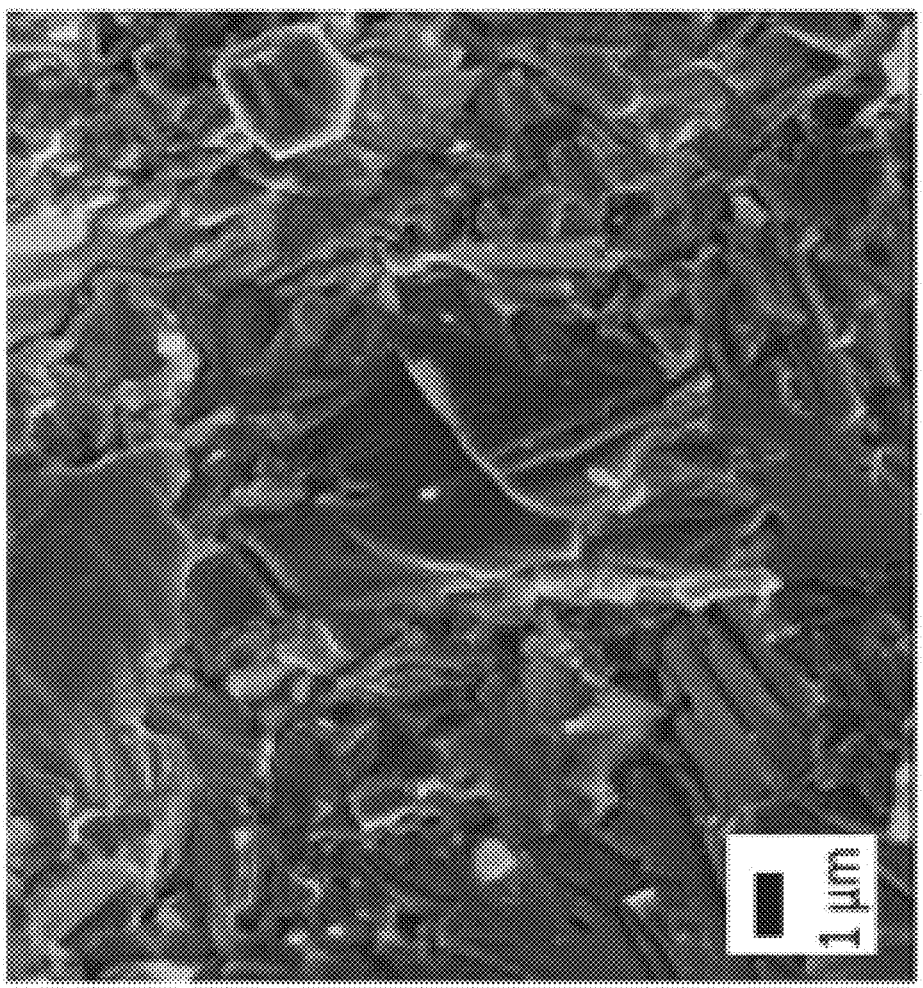
FIG. 3C is an SEM image of a fractured surface of bulk flash sintered sample HEN03 comprising $(Al_{0.20}Nb_{0.20}Ti_{0.40}Zr_{0.20})N$ synthesized using reaction flash sintering according to an embodiment of the subject invention.
Figure 4A:
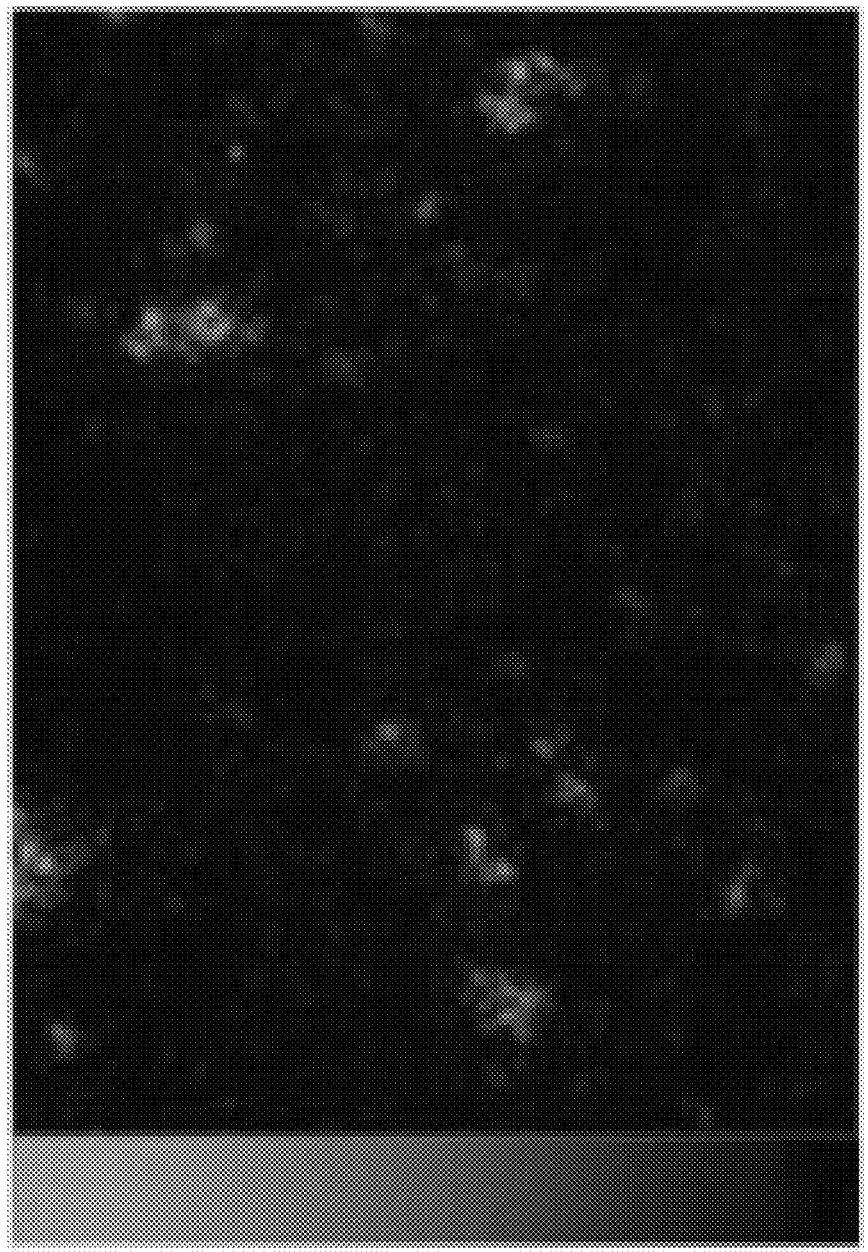
FIG. 4A is an Al—K energy dispersive X-Ray spectroscopy (EDX) map of fractured surface of bulk flash sintered sample HEN01 for $(Al_{0.17}Nb_{0.17}Ta_{0.17}Ti_{0.32}Zr_{0.17})N$ synthesized using reaction flash sintering showing uniform elemental distribution according to an embodiment of the subject invention.
Figure 4B:
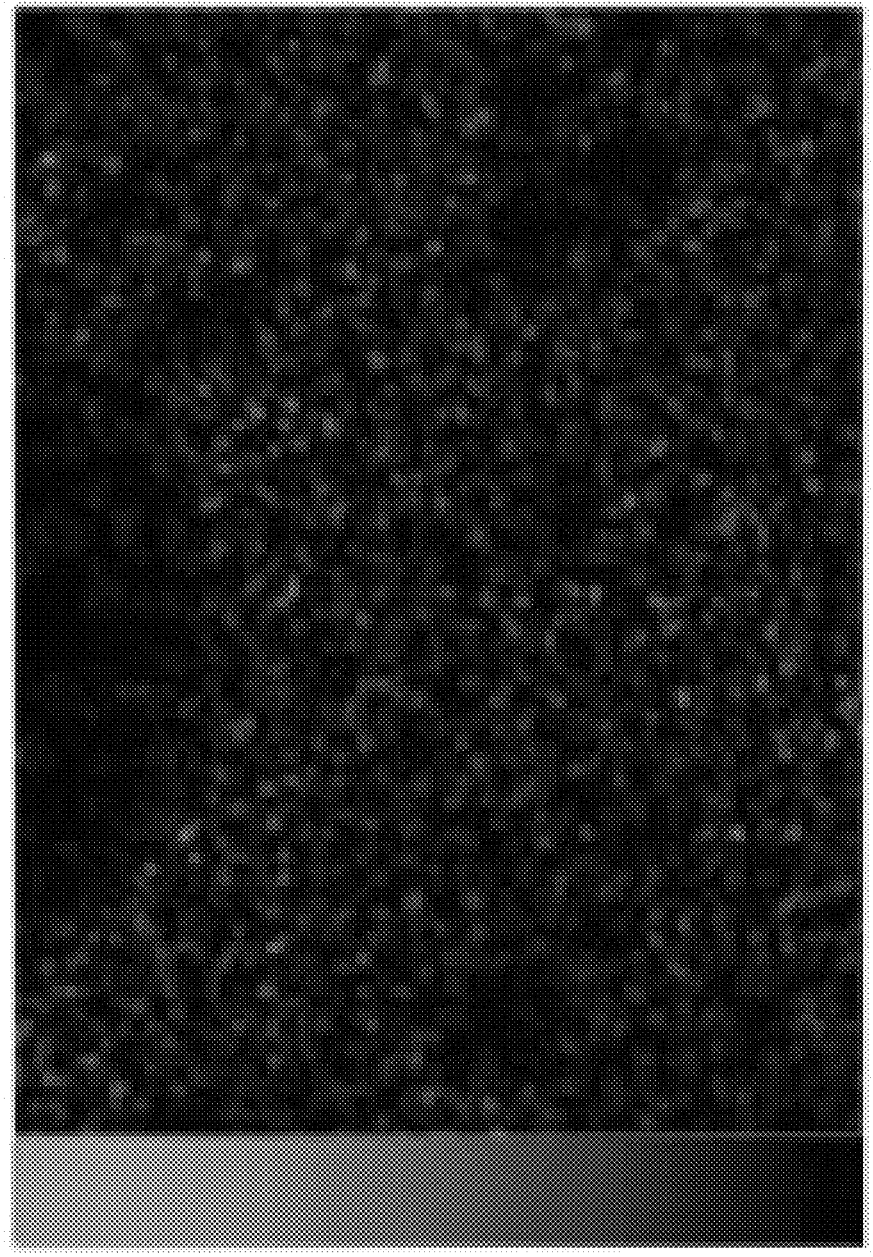
FIG. 4B is an Nb-L EDX map of fractured surface of bulk flash sintered sample HEN01 for $(Al_{0.17}Nb_{0.17}Ta_{0.17}Ti_{0.32}Zr_{0.17})N$ synthesized using reaction flash sintering showing uniform elemental distribution according to an embodiment of the subject invention.
Figure 4C:
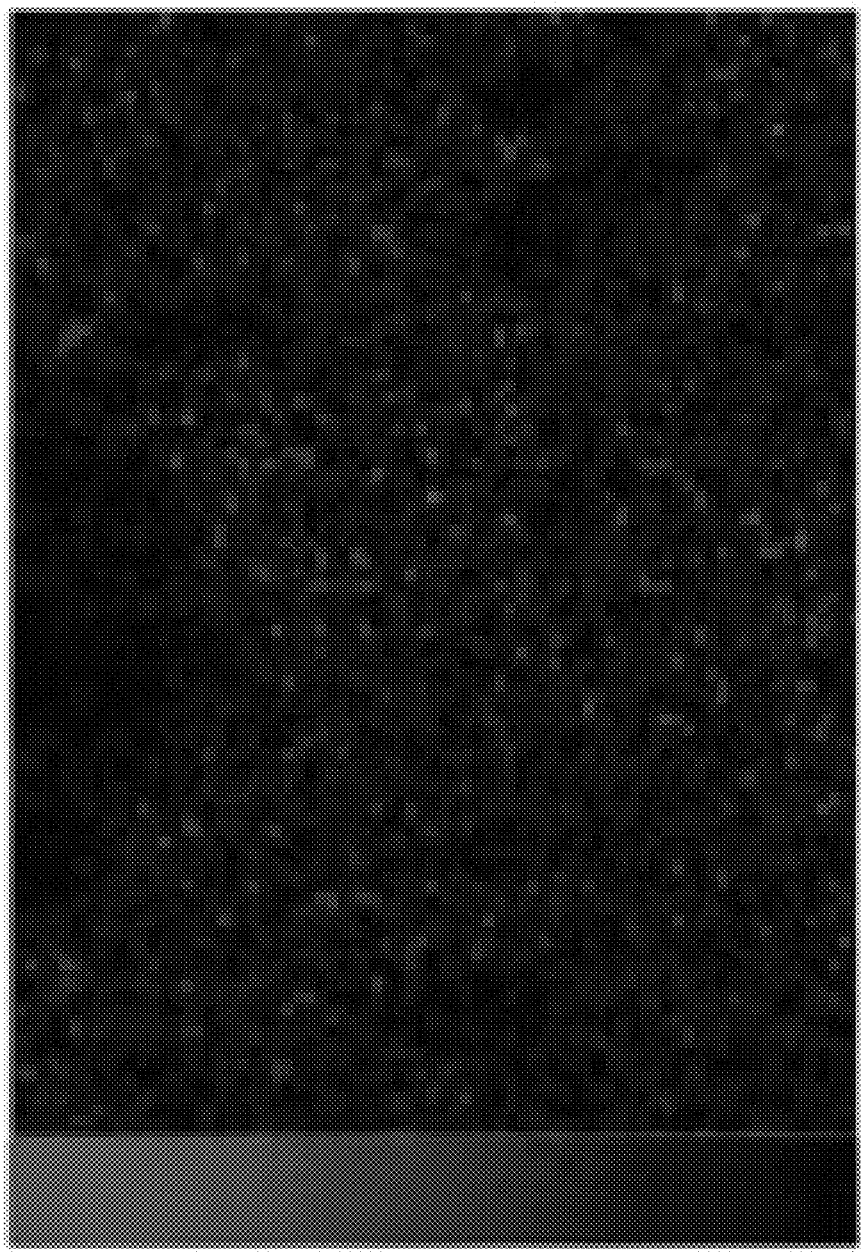
FIG. 4C is a Ta-M EDX map of fractured surface of bulk flash sintered sample HEN01 for $(Al_{0.17}Nb_{0.17}Ta_{0.17}Ti_{0.32}Zr_{0.17})N$ synthesized using reaction flash sintering showing uniform elemental distribution according to an embodiment of the subject invention.
Figure 4D:
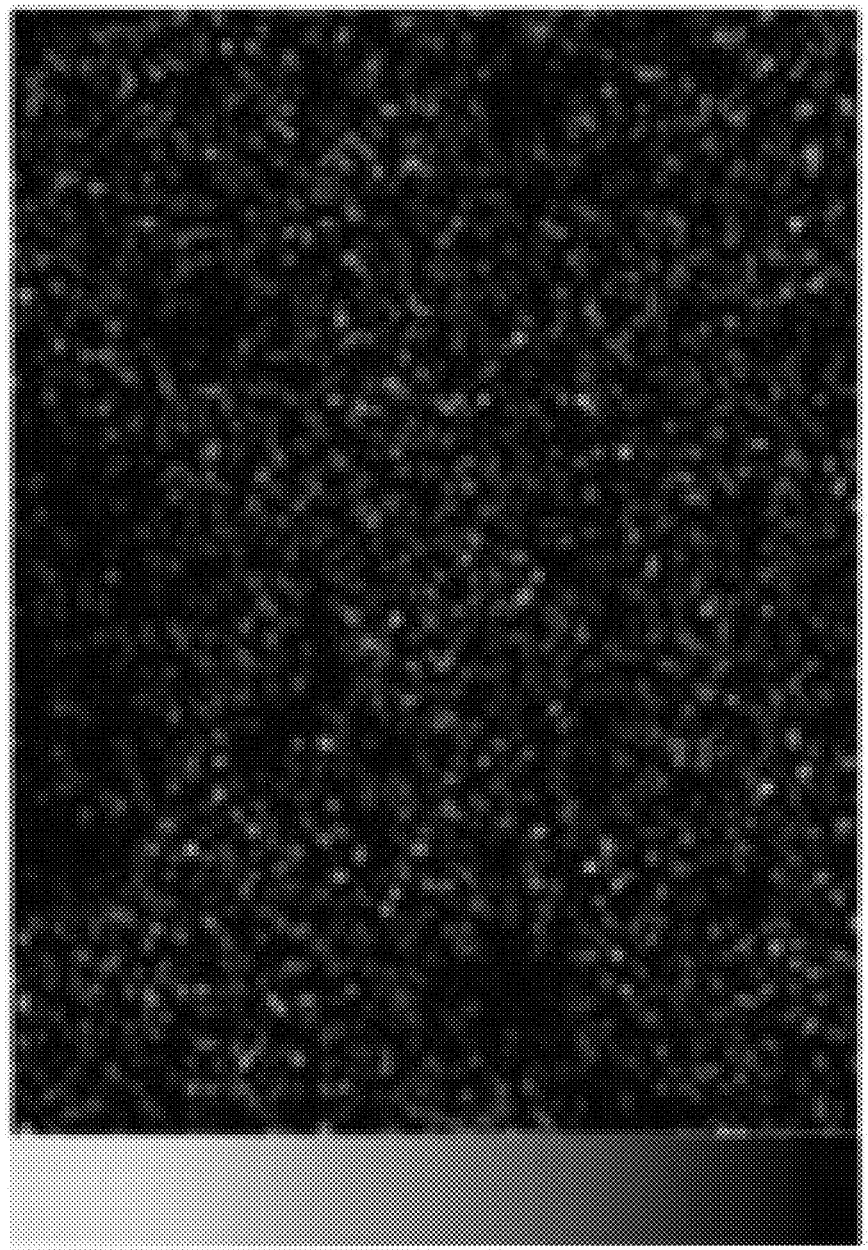
FIG. 4D is a Ti—K EDX map of fractured surface of bulk flash sintered sample HEN01 for $(Al_{0.17}Nb_{0.17}Ta_{0.17}Ti_{0.32}Zr_{0.17})N$ synthesized using reaction flash sintering showing uniform elemental distribution.
Figure 4E:
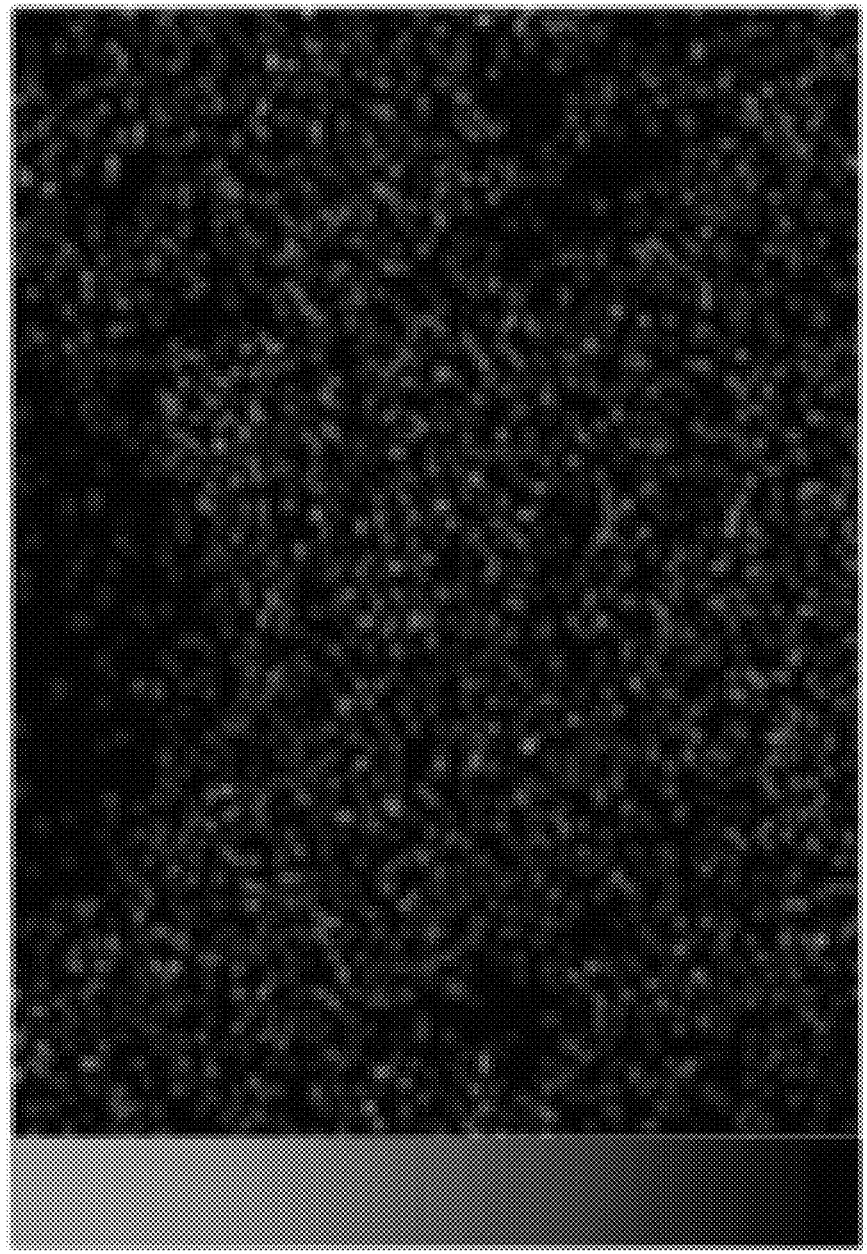
FIG. 4E is a Zr-L EDX map of fractured surface of bulk flash sintered sample HEN01 for $(Al_{0.17}Nb_{0.17}Ta_{0.17}Ti_{0.32}Zr_{0.17})N$ synthesized using reaction flash sintering showing uniform elemental distribution according to an embodiment of the subject invention.
Figure 5A:
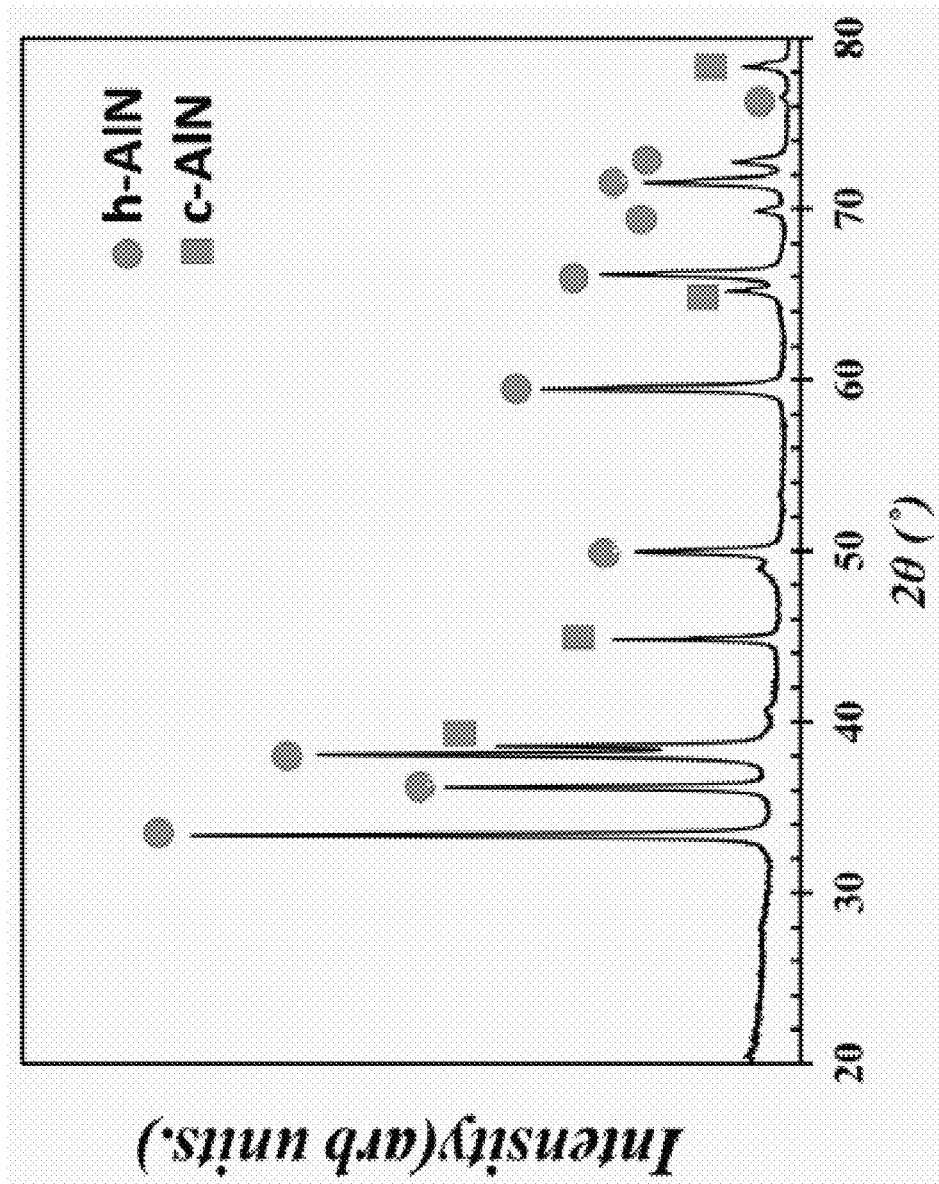
FIG. 5A illustrates the XRD pattern for precursors ZrN (PDF Card 04-004-2860) and $m-ZrO_2$ according to an embodiment of the subject invention.
Figure 5B:
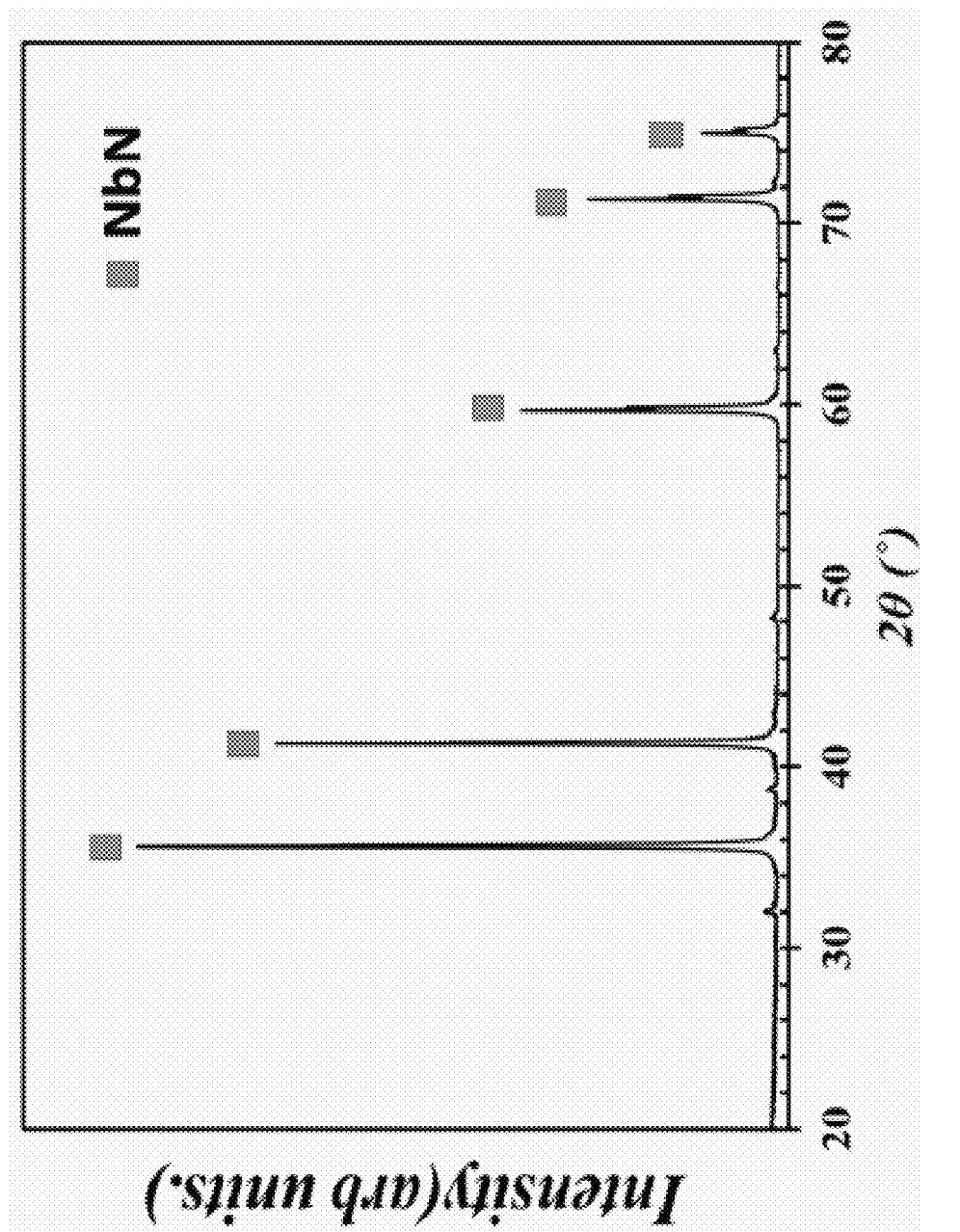
FIG. 5B illustrates the XRD pattern for precursor NbN (PDF Card 00-004-2895) according to an embodiment of the subject invention
Figure 5C:
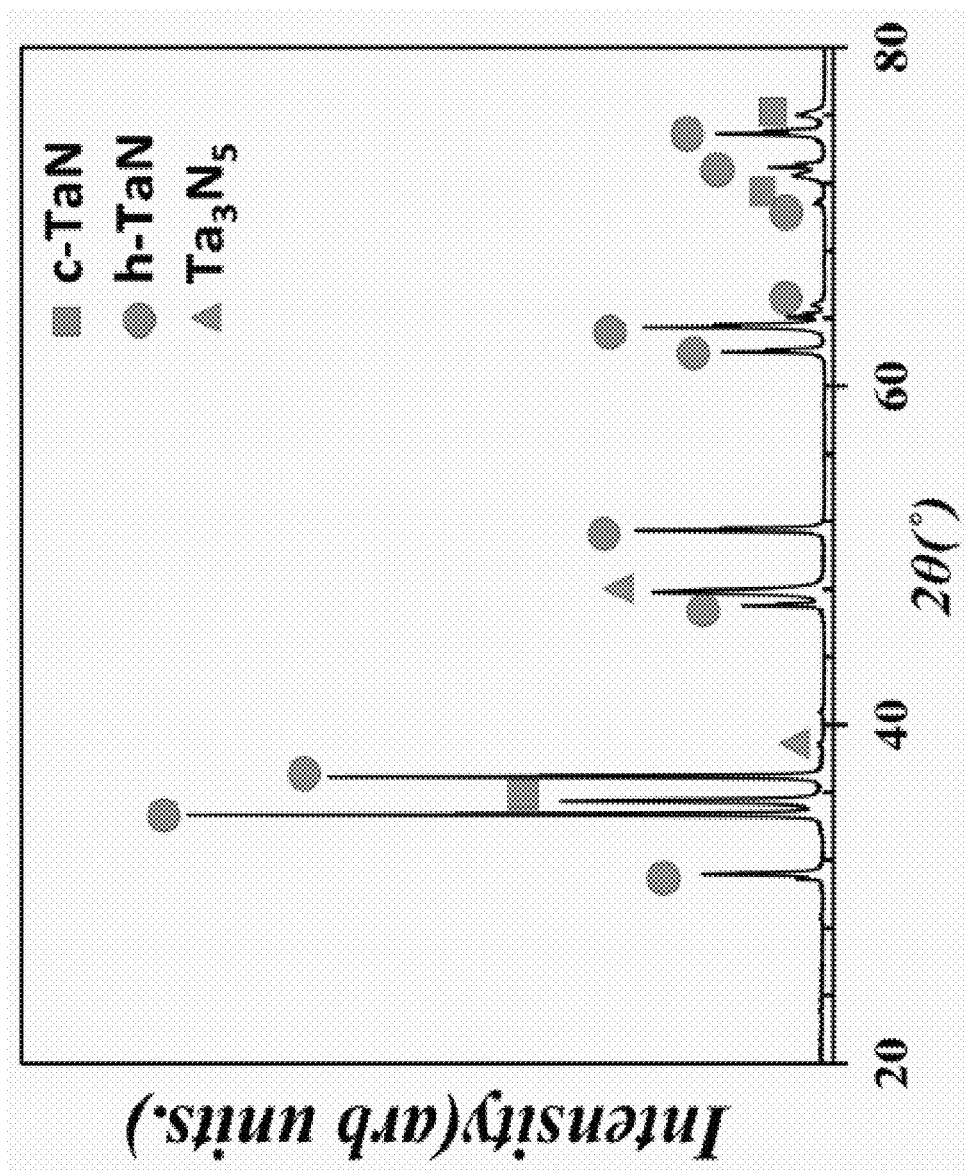
FIG. 5C illustrates the XRD pattern for precursors Cubic TaN (PDF Card 00-049-1283), Hexagonal TaN (PDF Card 00-039-1485), and $Ta_3N_5$ (PDF Card 04-007-1969) according to an embodiment of the subject invention.
Figure 5D:
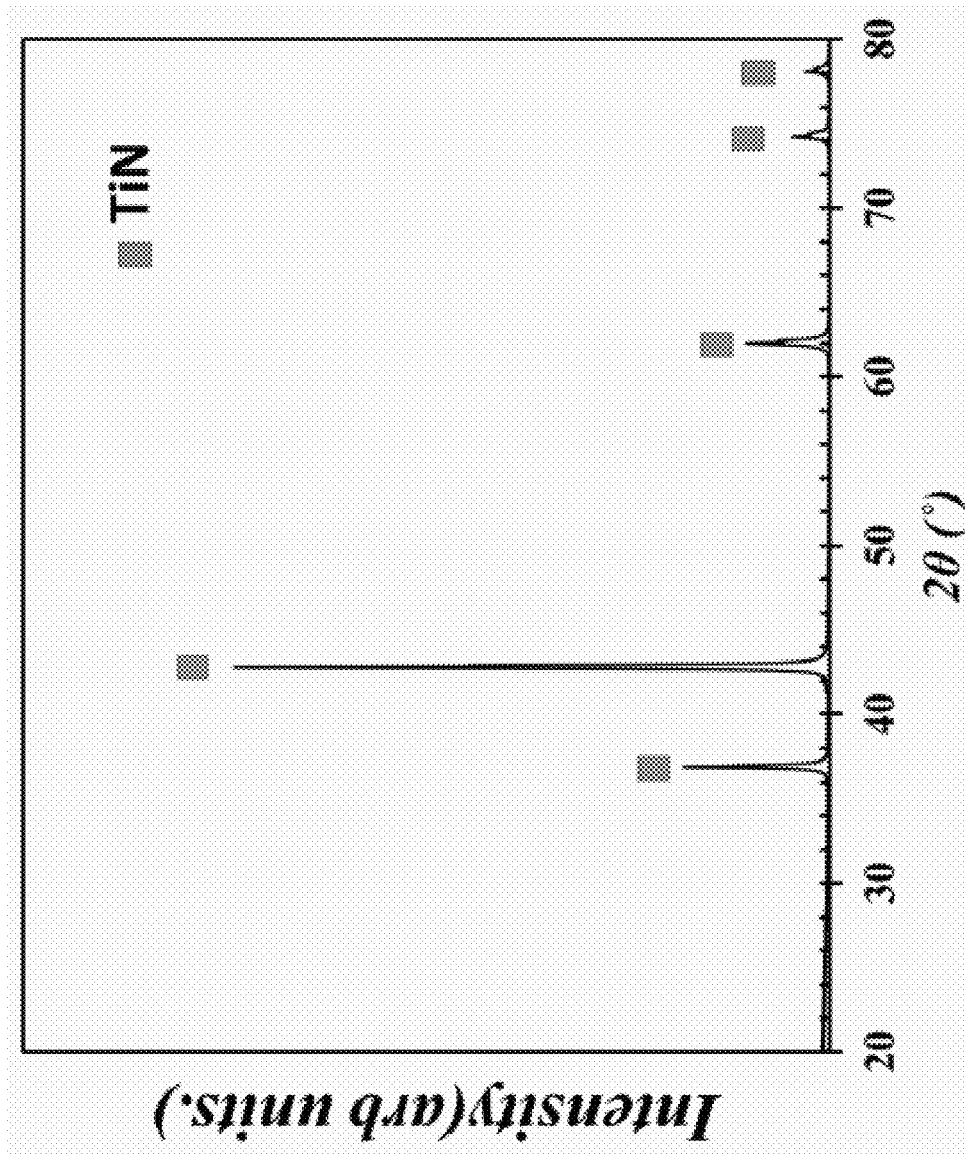
FIG. 5D illustrates the XRD pattern for precursor TiN (PDF Card 04-002-1925) according to an embodiment of the subject invention.
Figure 5E:
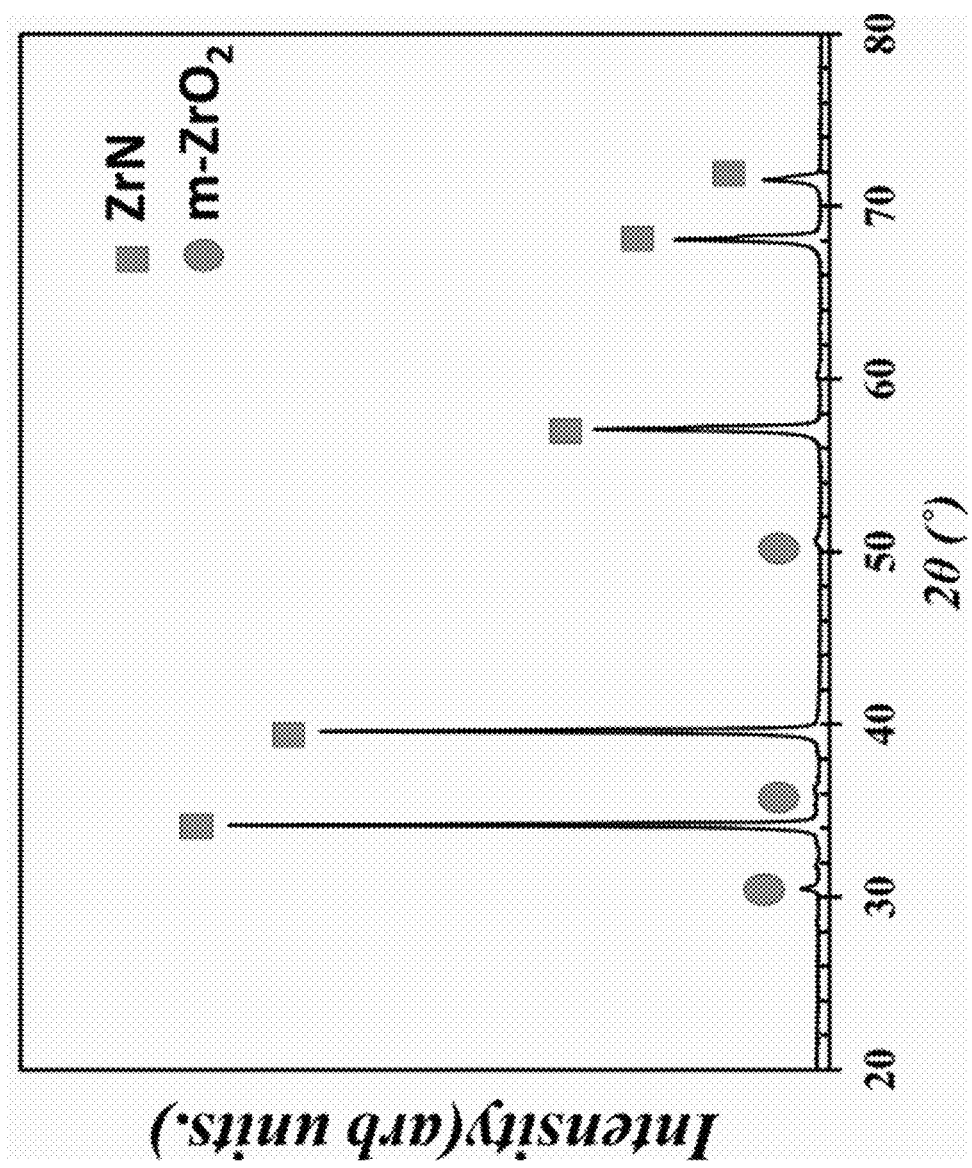
FIG. 5E illustrates the XRD pattern for precursors ZrN (PDF Card 04-004-2860), and $m-ZrO_2$ according to an embodiment of the subject invention.
Figure 6A:
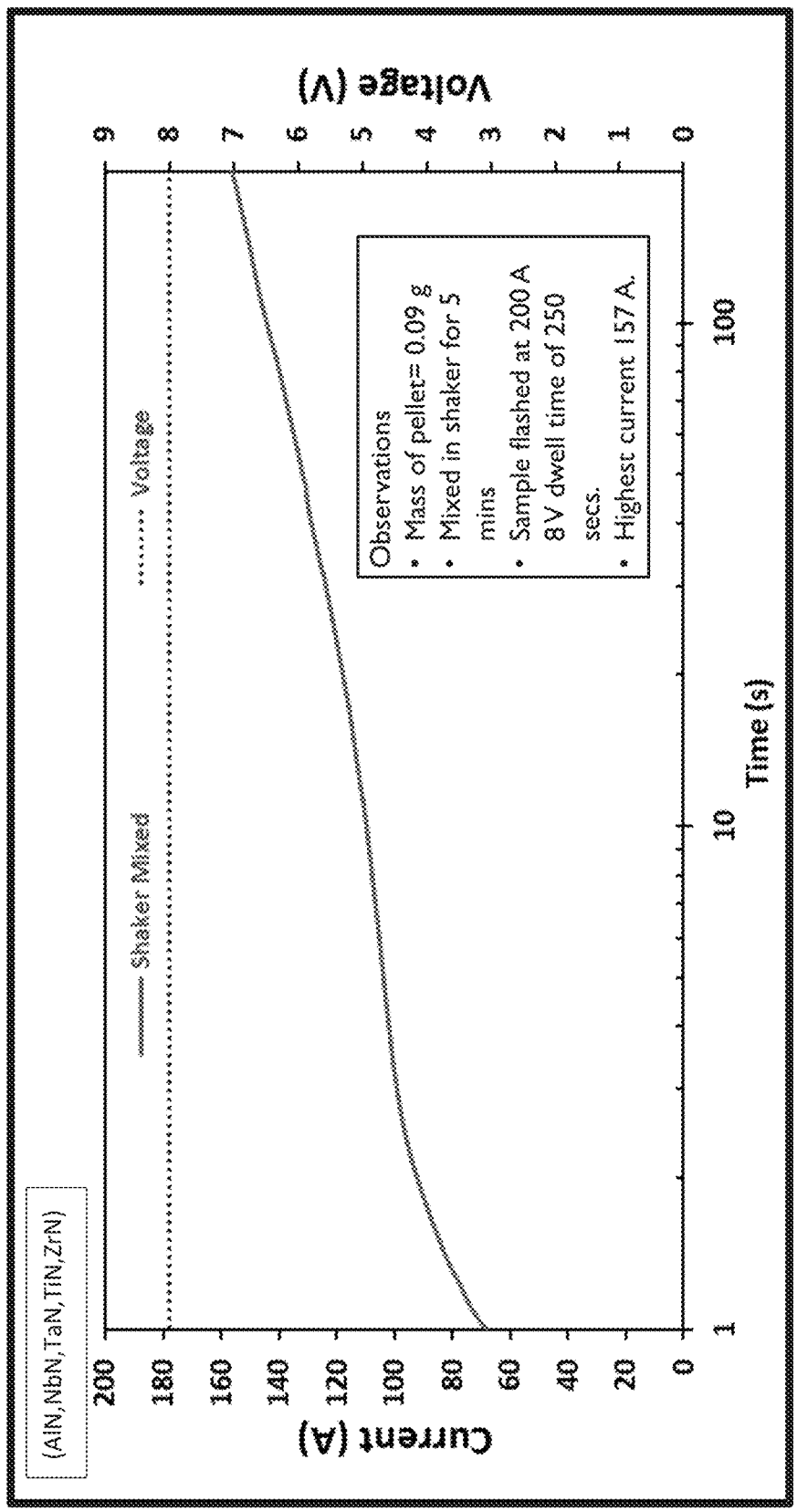
FIG. 6A is a plot of applied voltage and resulting current vs. time for reaction flash sintering of (AlN, NbN, TaN, TiN, ZrN) powder according to an embodiment of the subject invention.
Figure 6B:
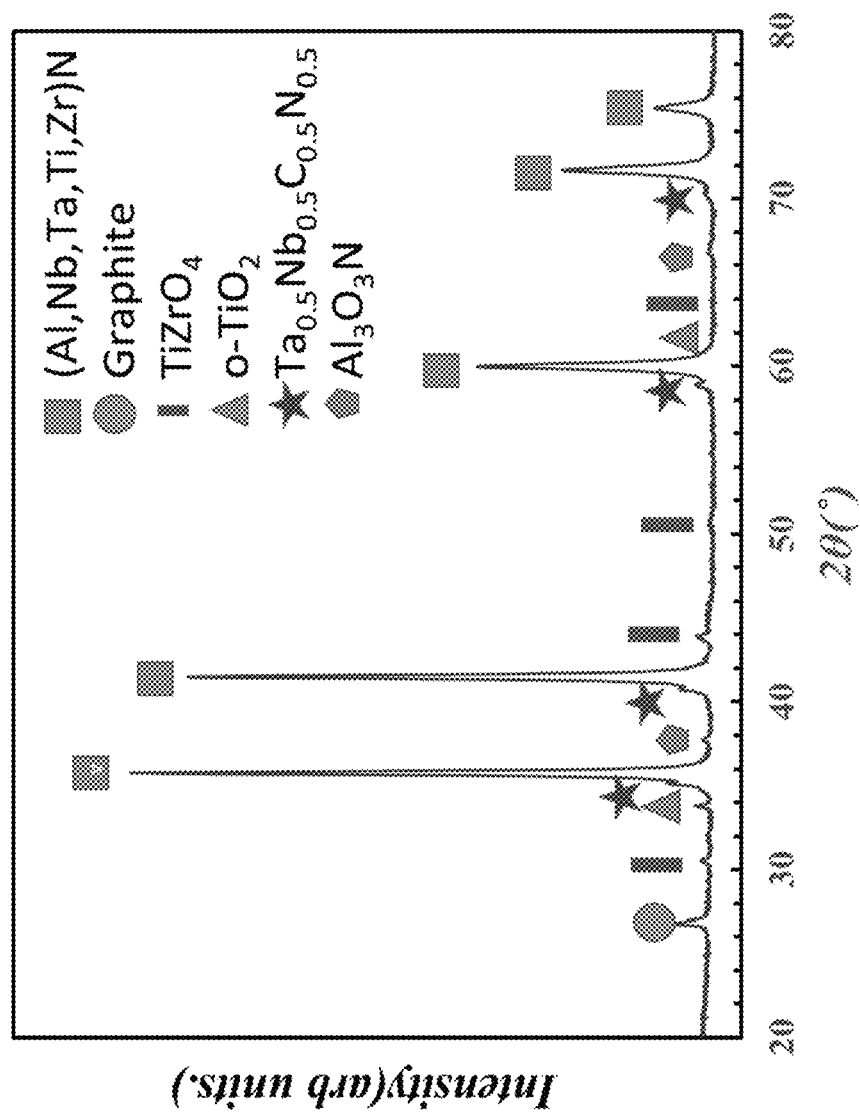
FIG. 6B illustrates the XRD pattern for 5MN (AlN, NbN, TaN, TiN, ZrN) according to an embodiment of the subject invention.
Figure 7A:
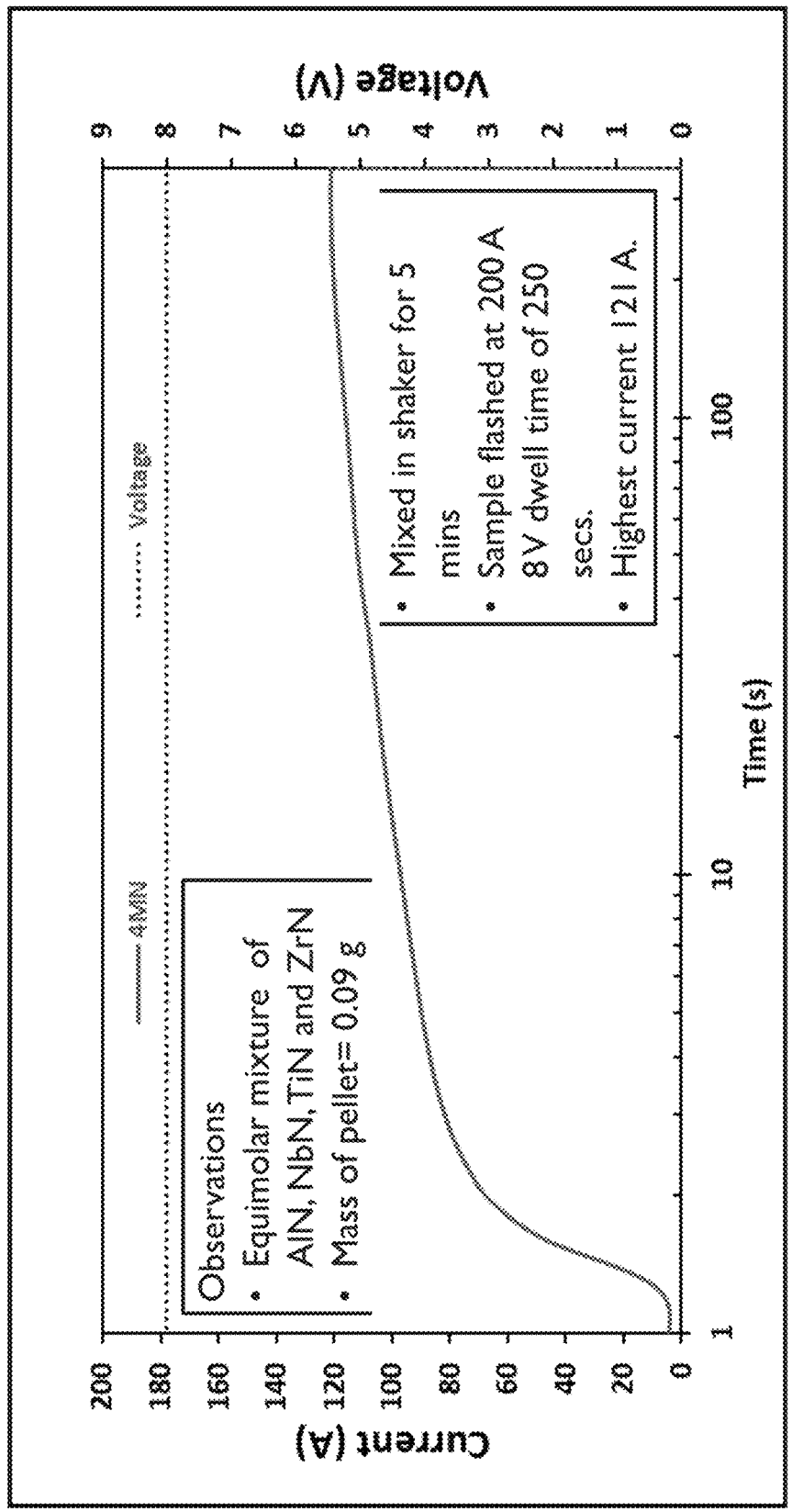
FIG. 7A is a plot of applied voltage and resulting current vs. time for reaction flash sintering of 4MN (AlN, NbN, TiN, ZrN) powder according to an embodiment of the subject invention.
Figure 7B:
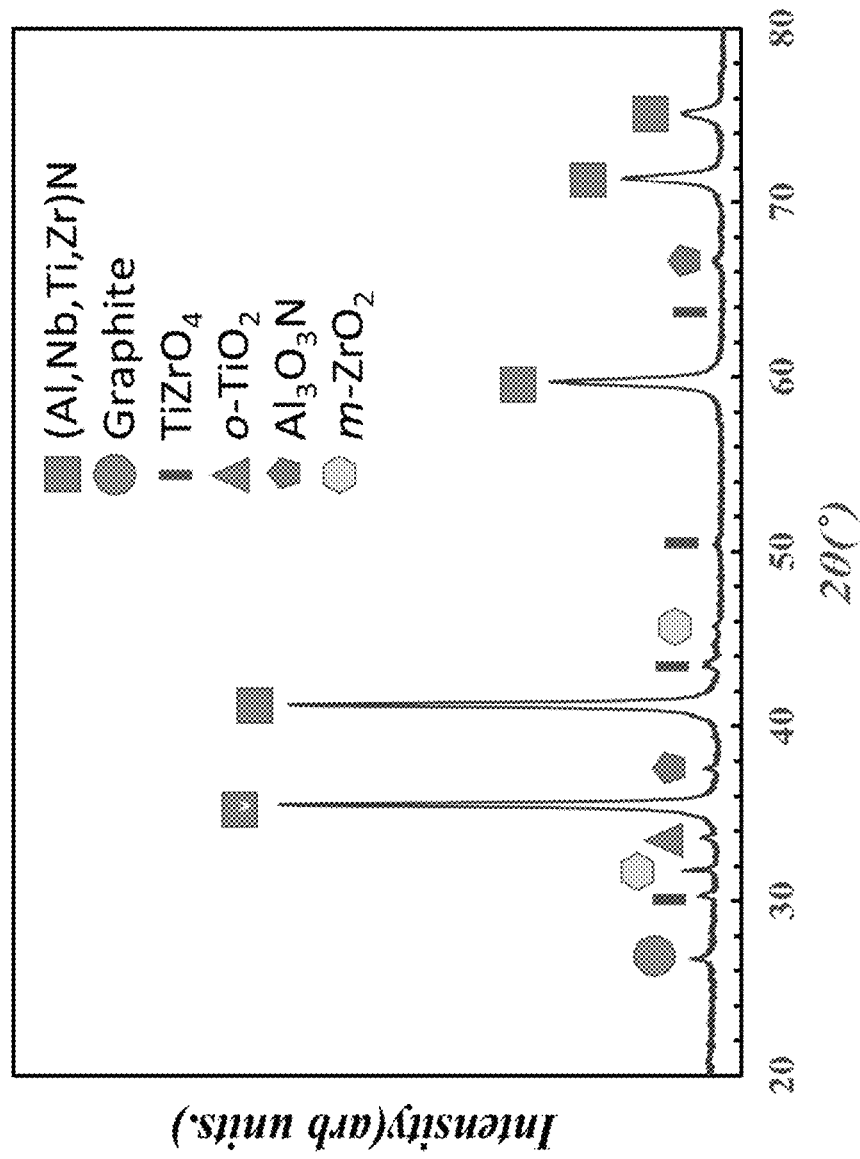
FIG. 7B illustrates the XRD pattern for 4MN (AlN, NbN, TiN, ZrN) according to an embodiment of the subject invention.
Figure 8A:
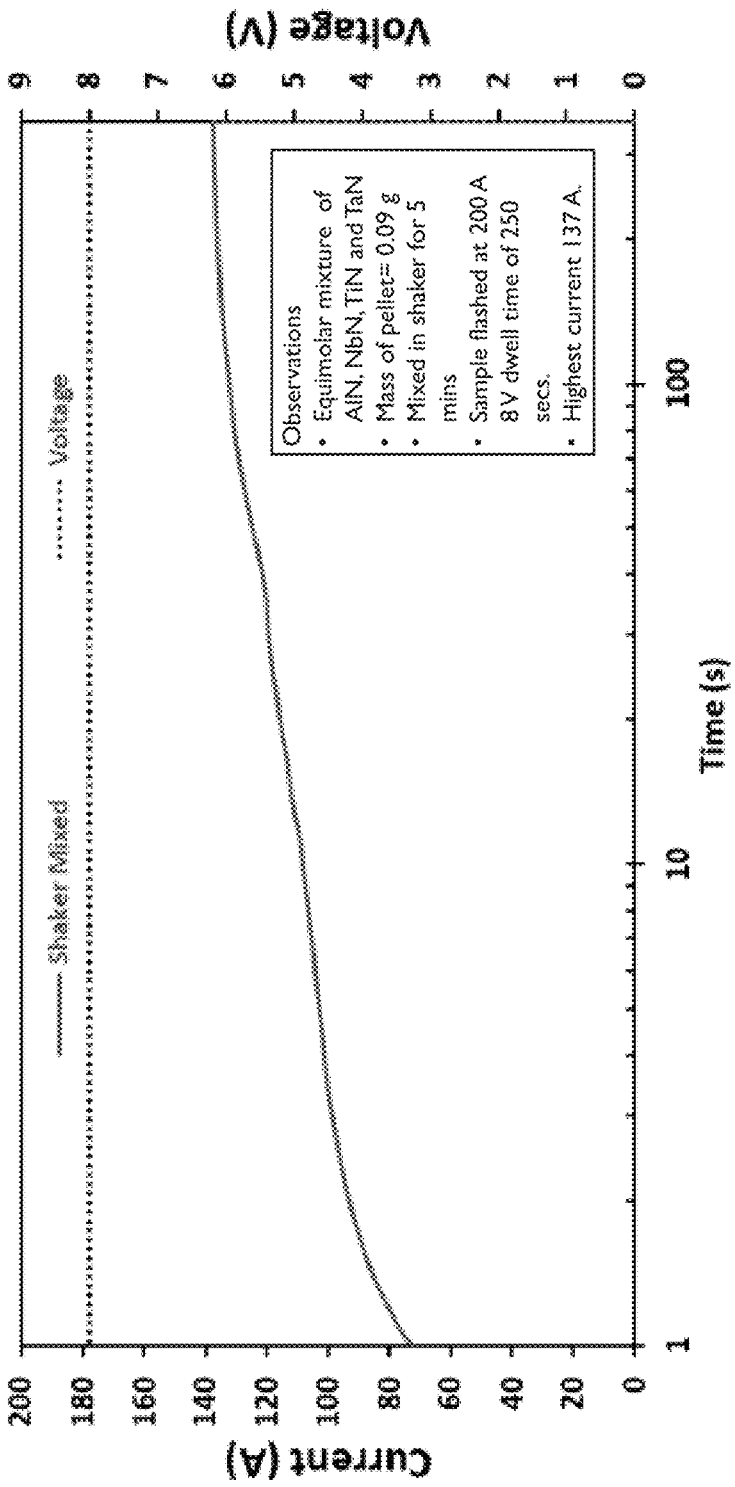
FIG. 8A is a plot of applied voltage and resulting current vs. time for reaction flash sintering of 4MN (AlN, NbN, TaN, TiN) powder according to an embodiment of the subject invention.
Figure 8B:
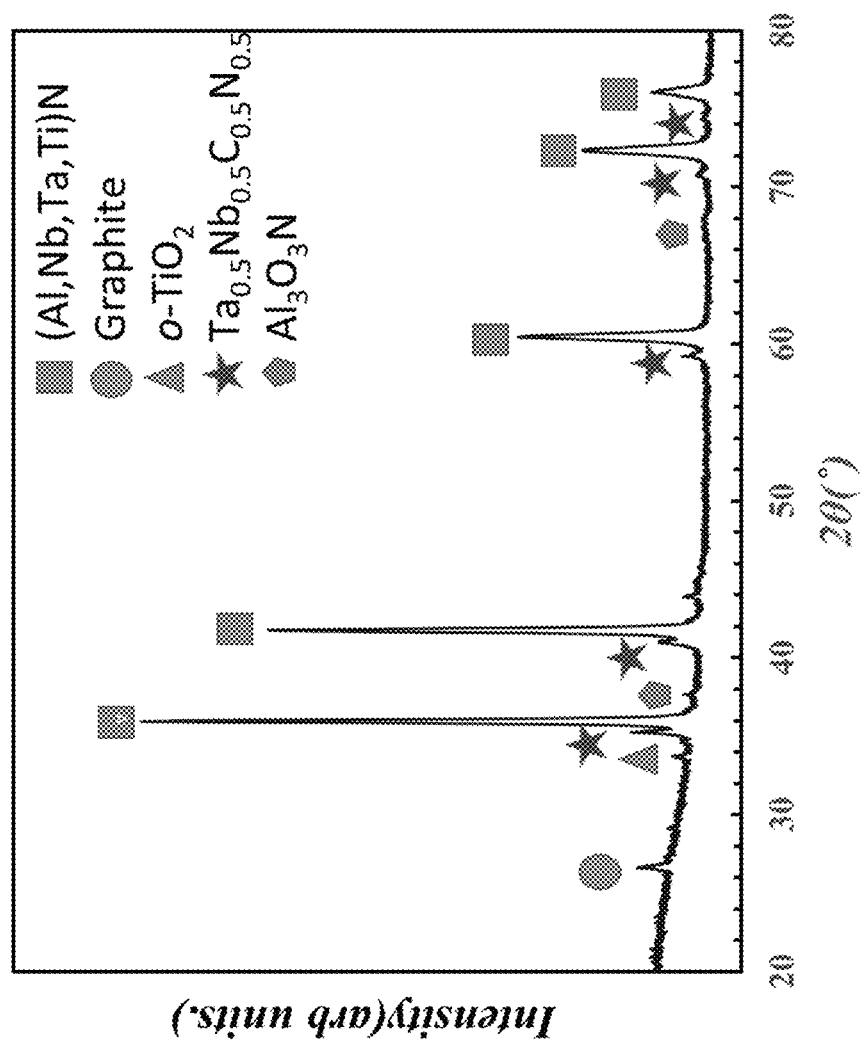
FIG. 8B illustrates the XRD pattern for 4MN (AlN, NbN, TaN, TiN) according to an embodiment of the subject invention.
Figure 9A:
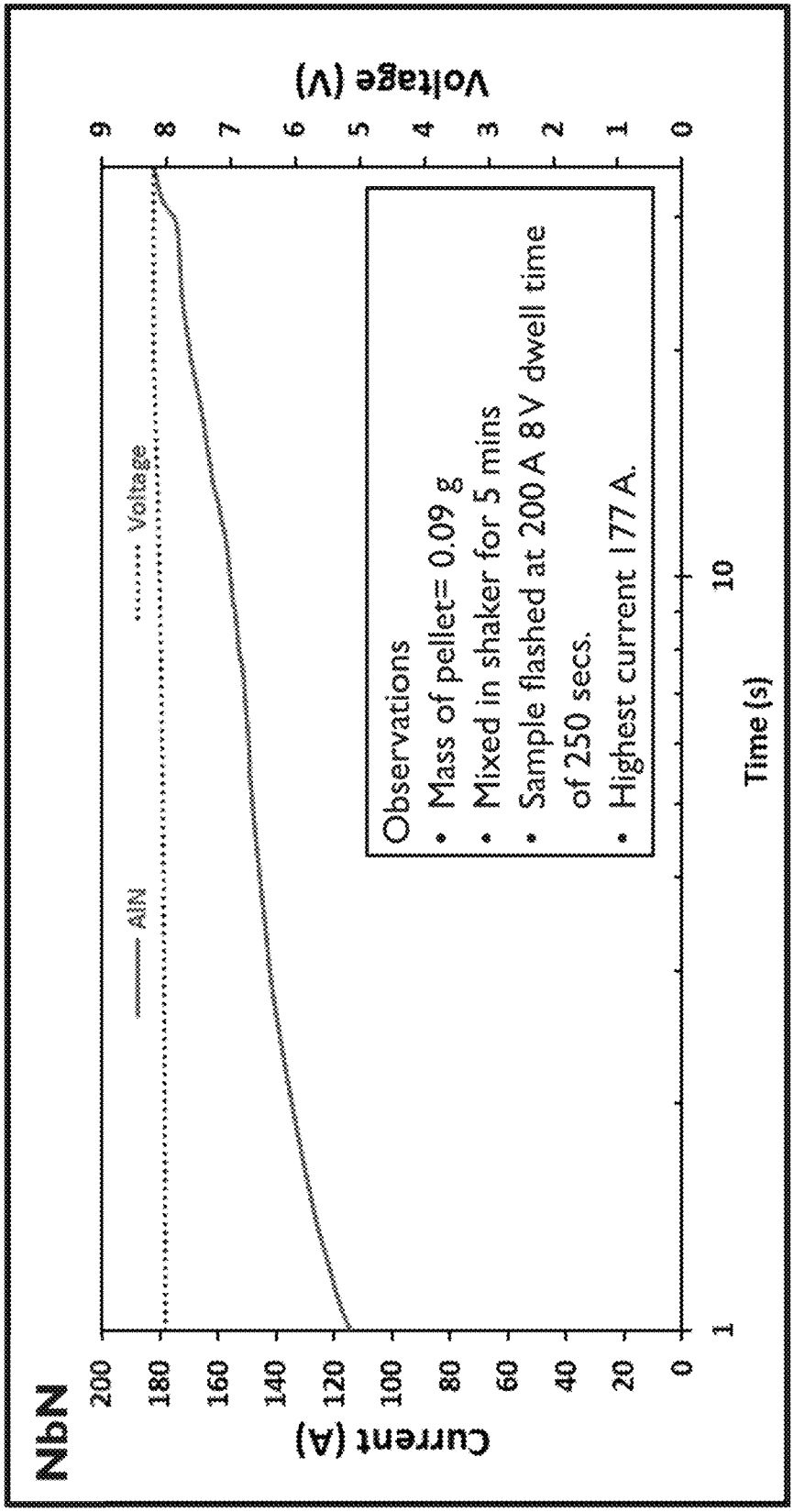
FIG. 9A is a plot of applied voltage and resulting current vs. time for reaction flash sintering of individual nitride (NbN) powder according to an embodiment of the subject invention.
Figure 9B:
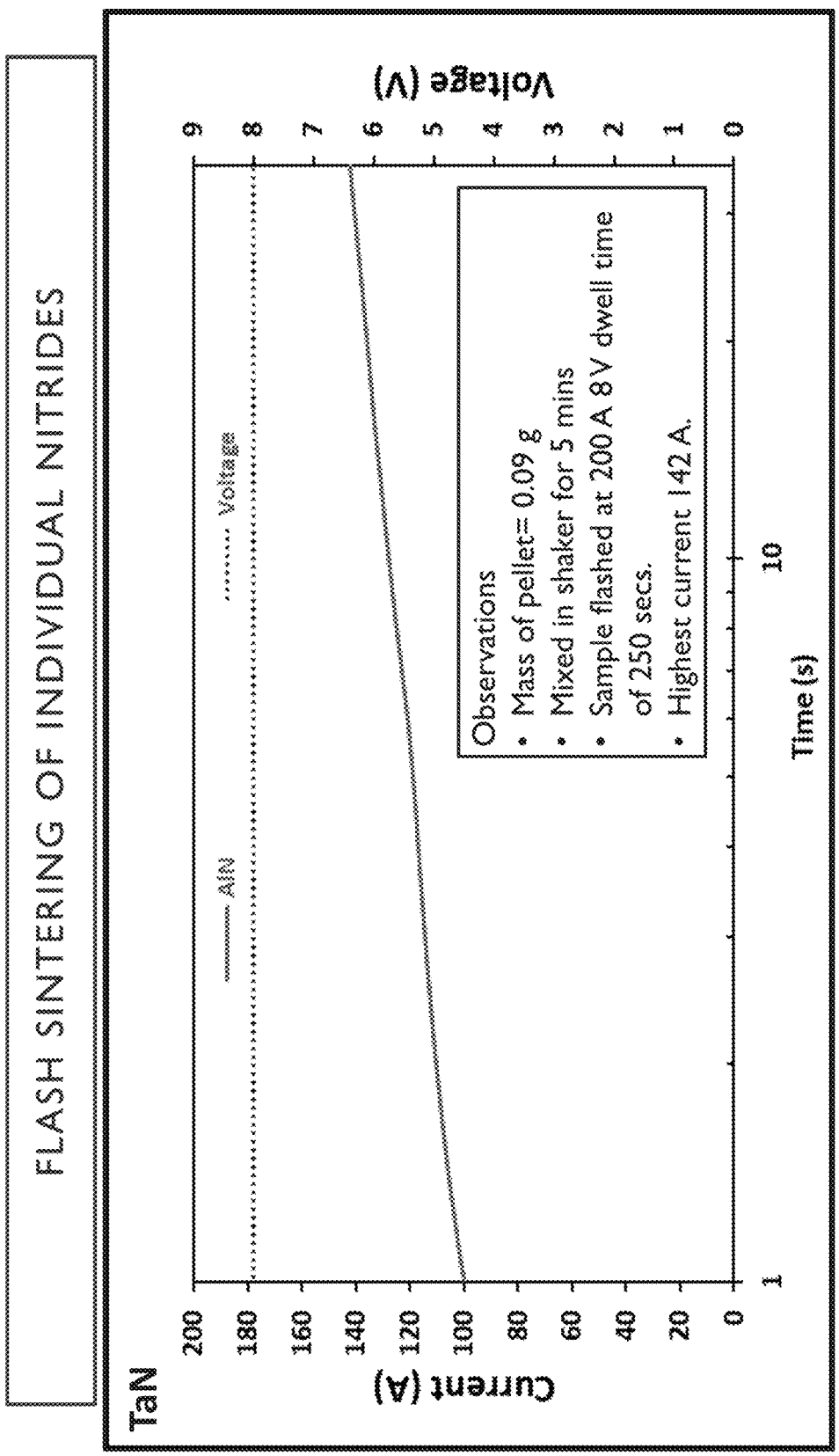
FIG. 9B is a plot of applied voltage and resulting current vs. time for reaction flash sintering of individual nitride (TaN) powder according to an embodiment of the subject invention.
Figure 9C:
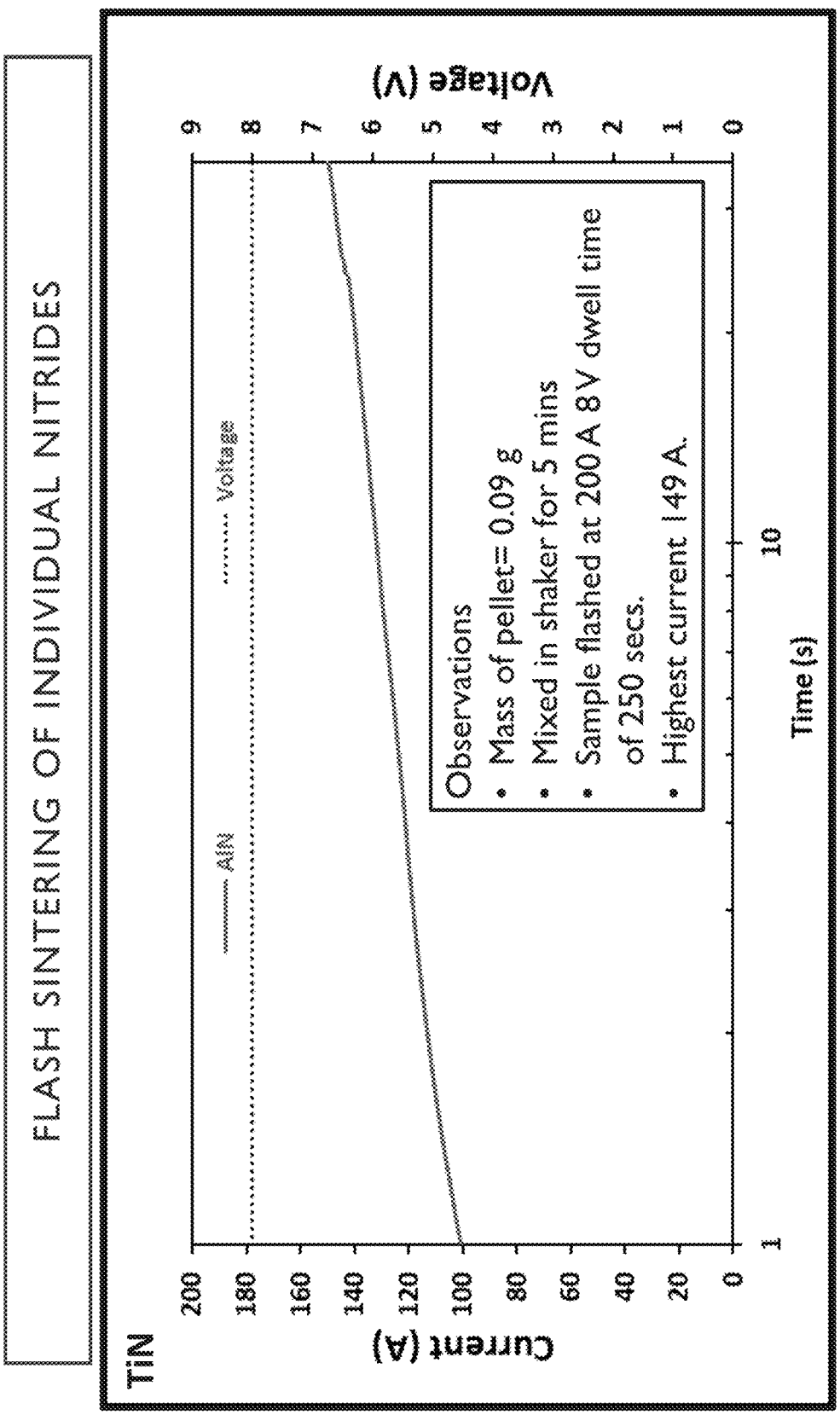
FIG. 9C is a plot of applied voltage and resulting current vs. time for reaction flash sintering of individual nitride (TiN) powder according to an embodiment of the subject invention.
Figure 9D:
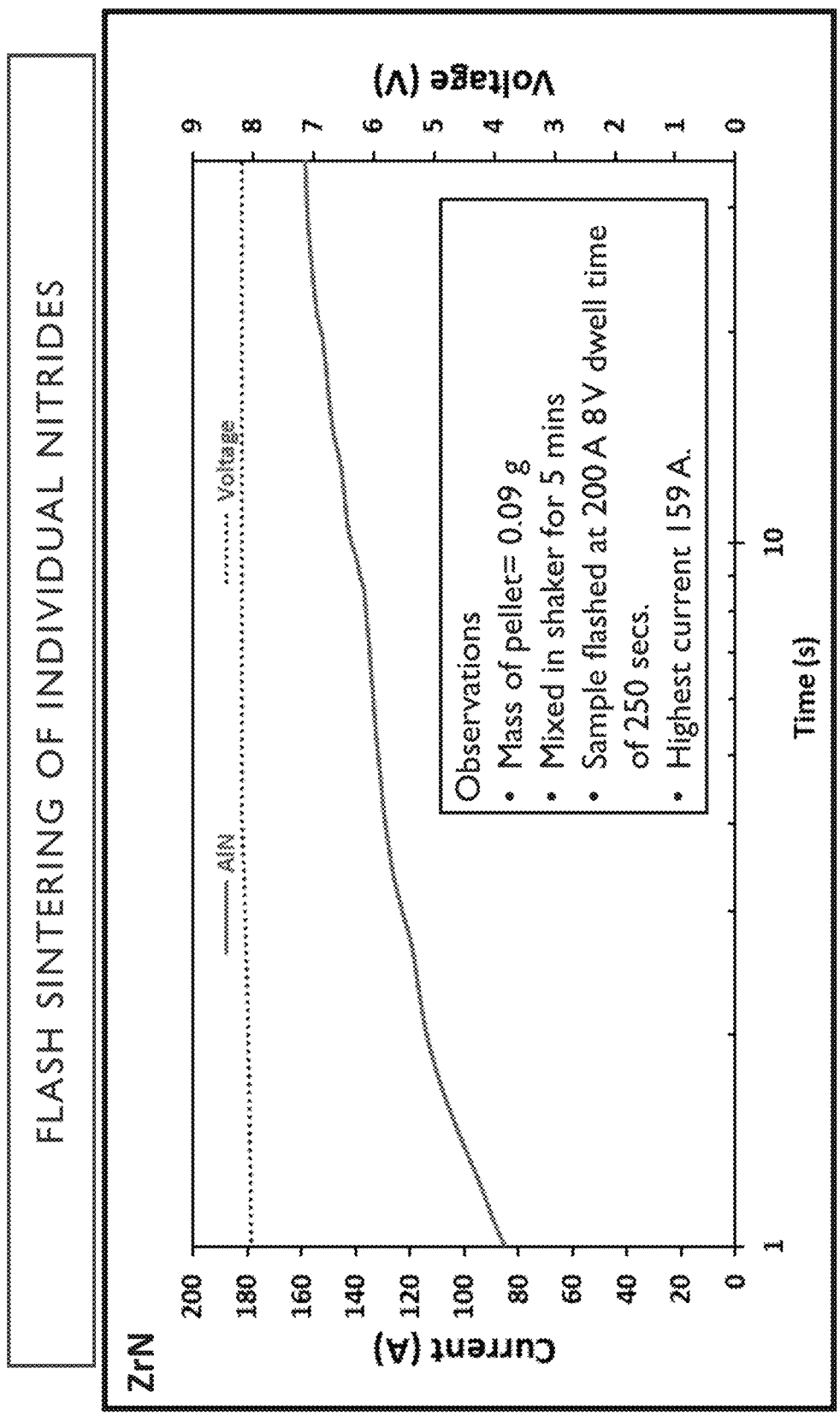
FIG. 9D is a plot of applied voltage and resulting current vs. time for reaction flash sintering of individual nitride (ZrN) powder according to an embodiment of the subject invention.
Figure 10A:
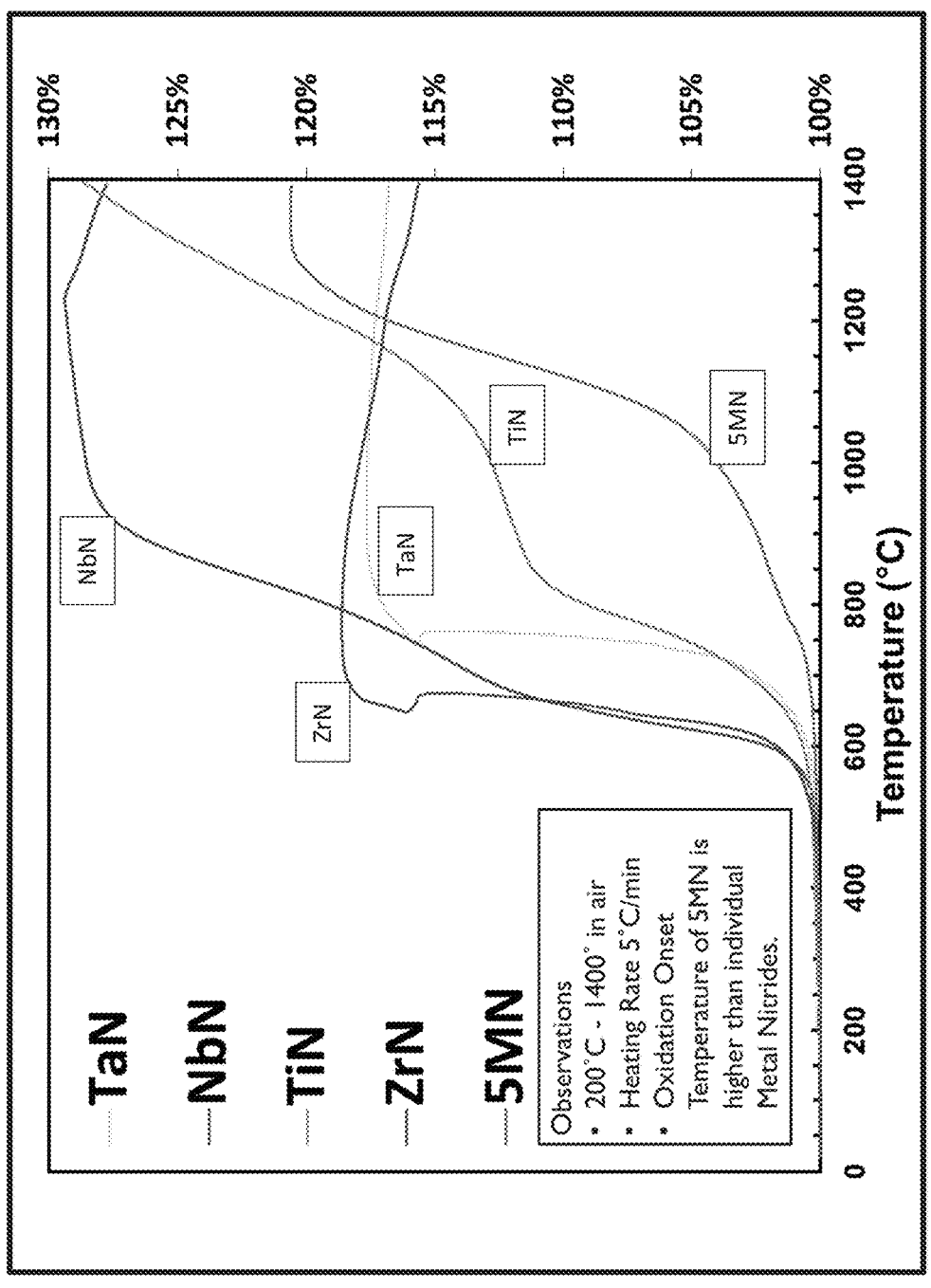
FIG. 10A is a plot of TGA vs. Temperature for 5MN (AlN, NbN, TaN, TiN, ZrN) and individual nitrides according to an embodiment of the subject invention.
Figure 10B:
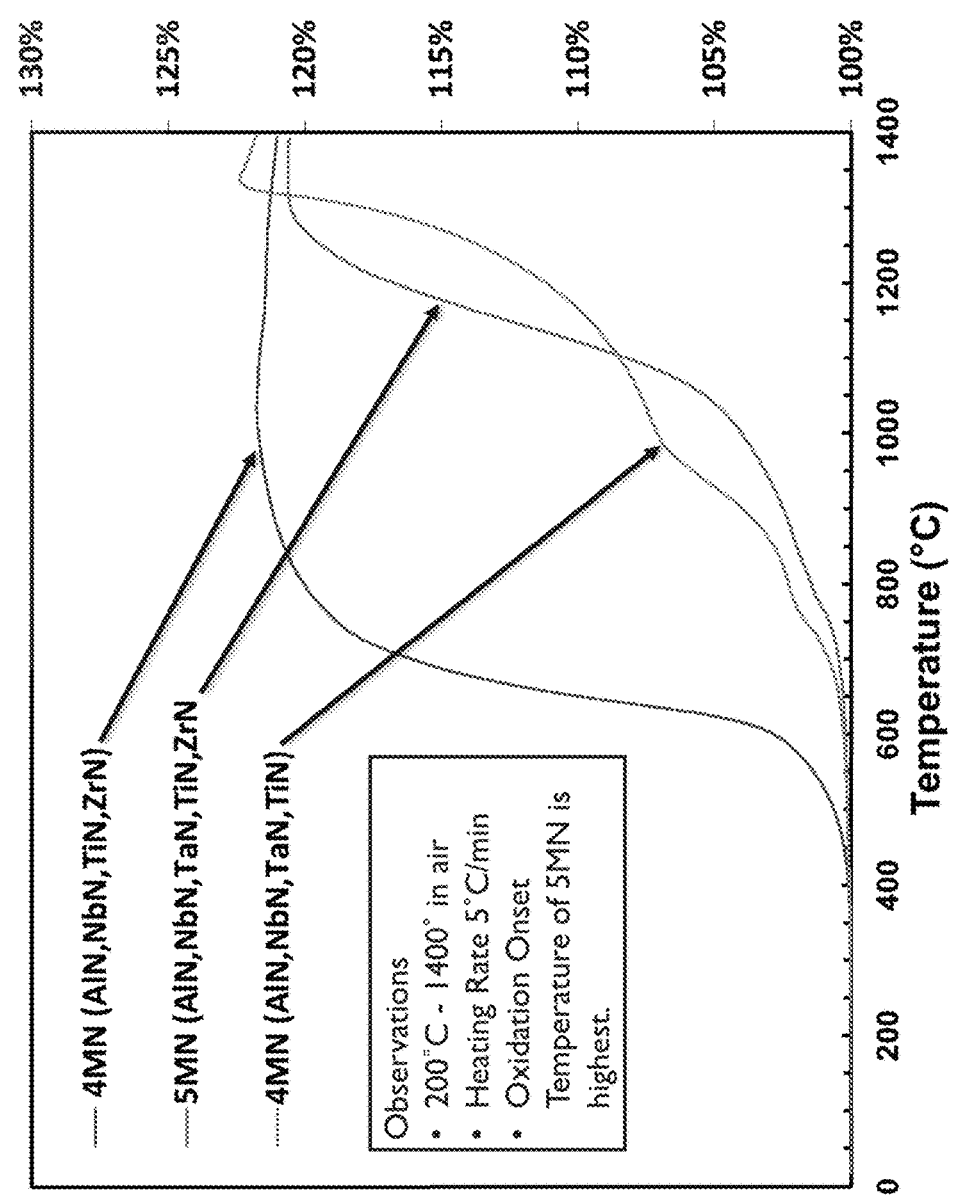
FIG. 10B is a plot of TGA vs. Temperature for 5MN (AlN, NbN, TaN, TiN, ZrN), 4MN (AlN, NbN, TiN, ZrN), and 4MN (AlN, NbN, TaN, TiN) according to an embodiment of the subject invention.
Figure 11A:
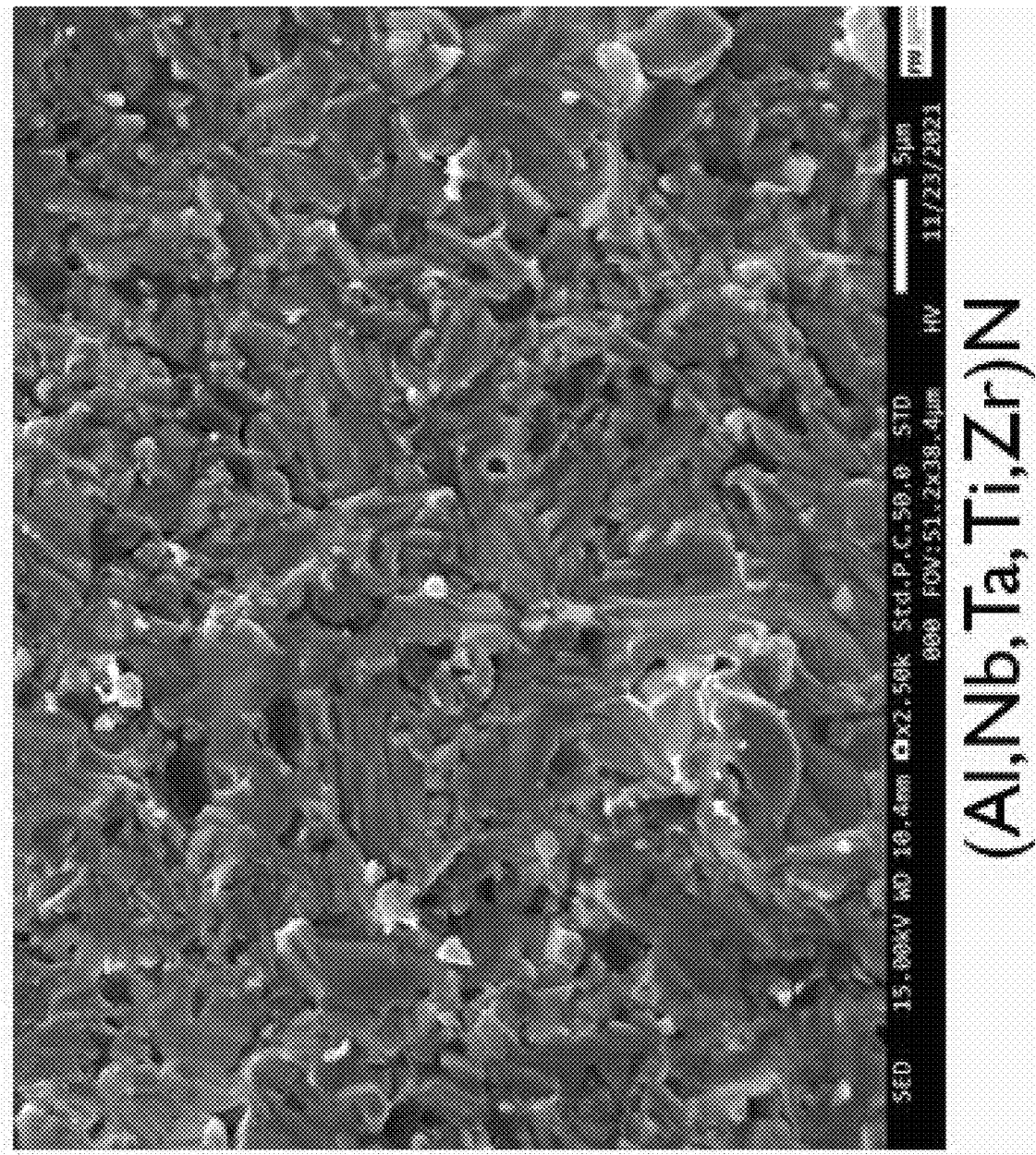
FIG. 11A is an SEM image of a fractured surface of flash sintered 5MN (AlN, NbN, TaN, TiN, ZrN) according to an embodiment of the subject invention.
Figure 11B:
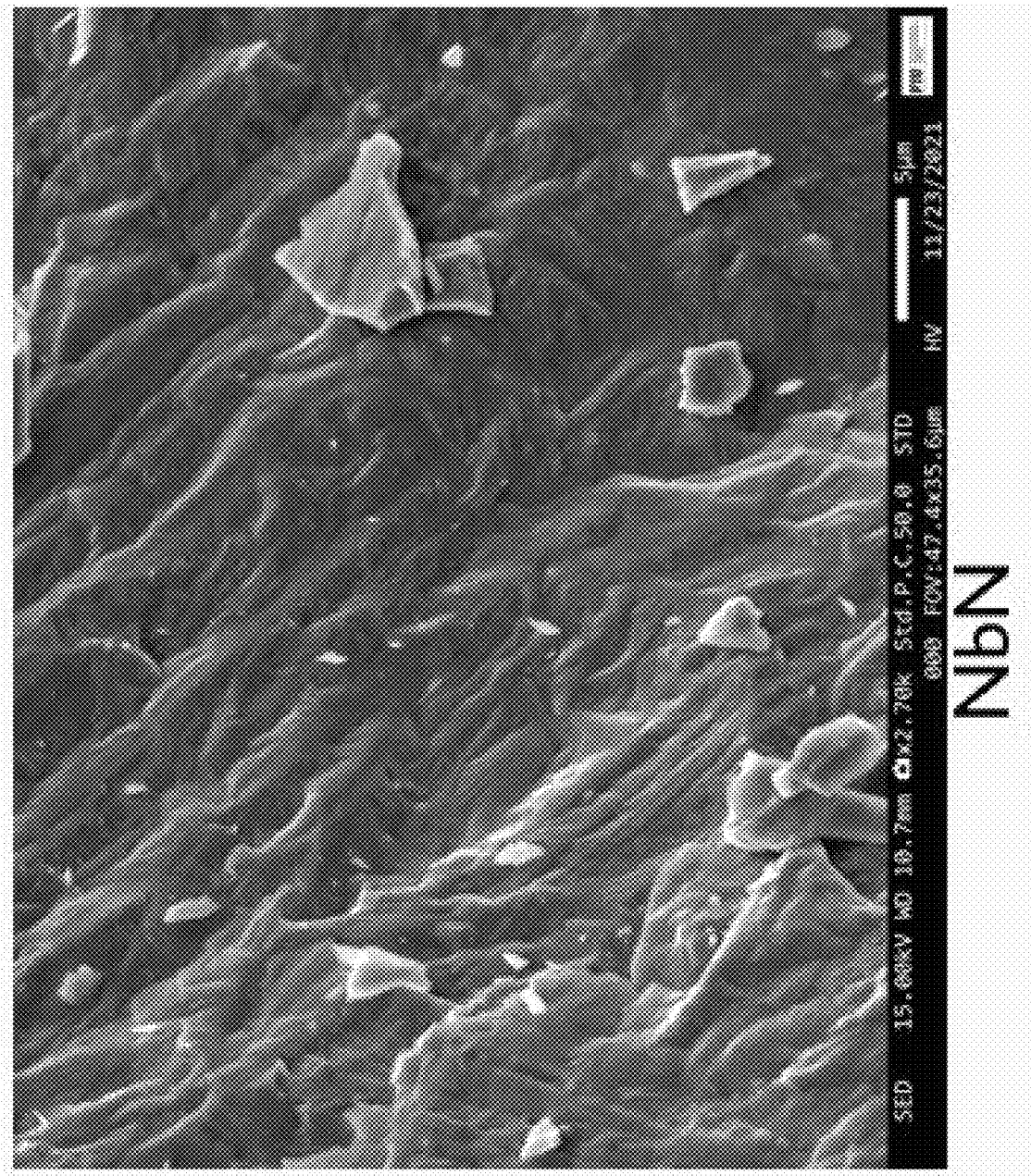
FIG. 11B is an SEM image of a fractured surface of flash sintered NbN according to an embodiment of the subject invention.
Figure 11C:
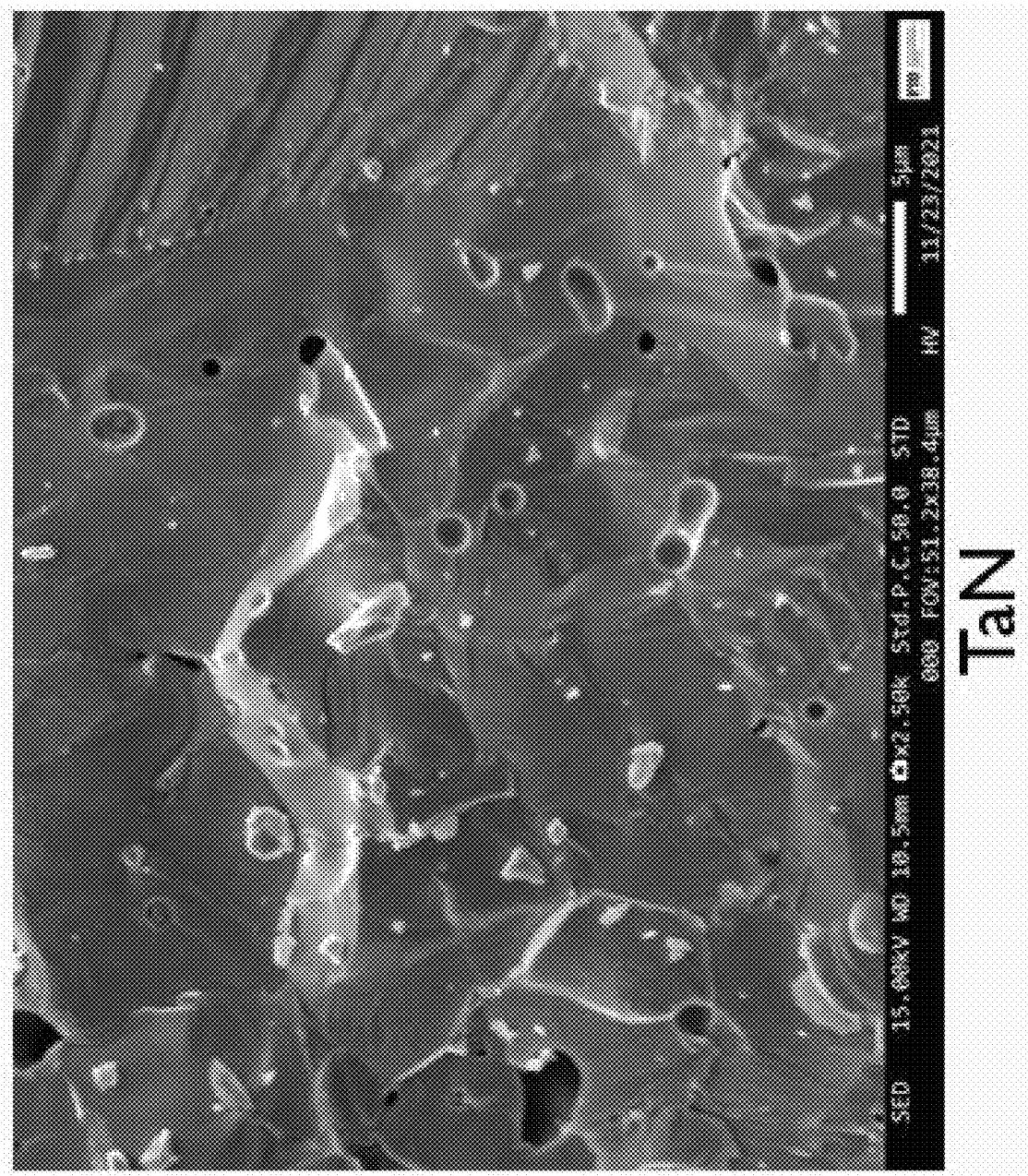
FIG. 11C is an SEM image of a fractured surface of flash sintered TaN according to an embodiment of the subject invention.
Figure 11D:
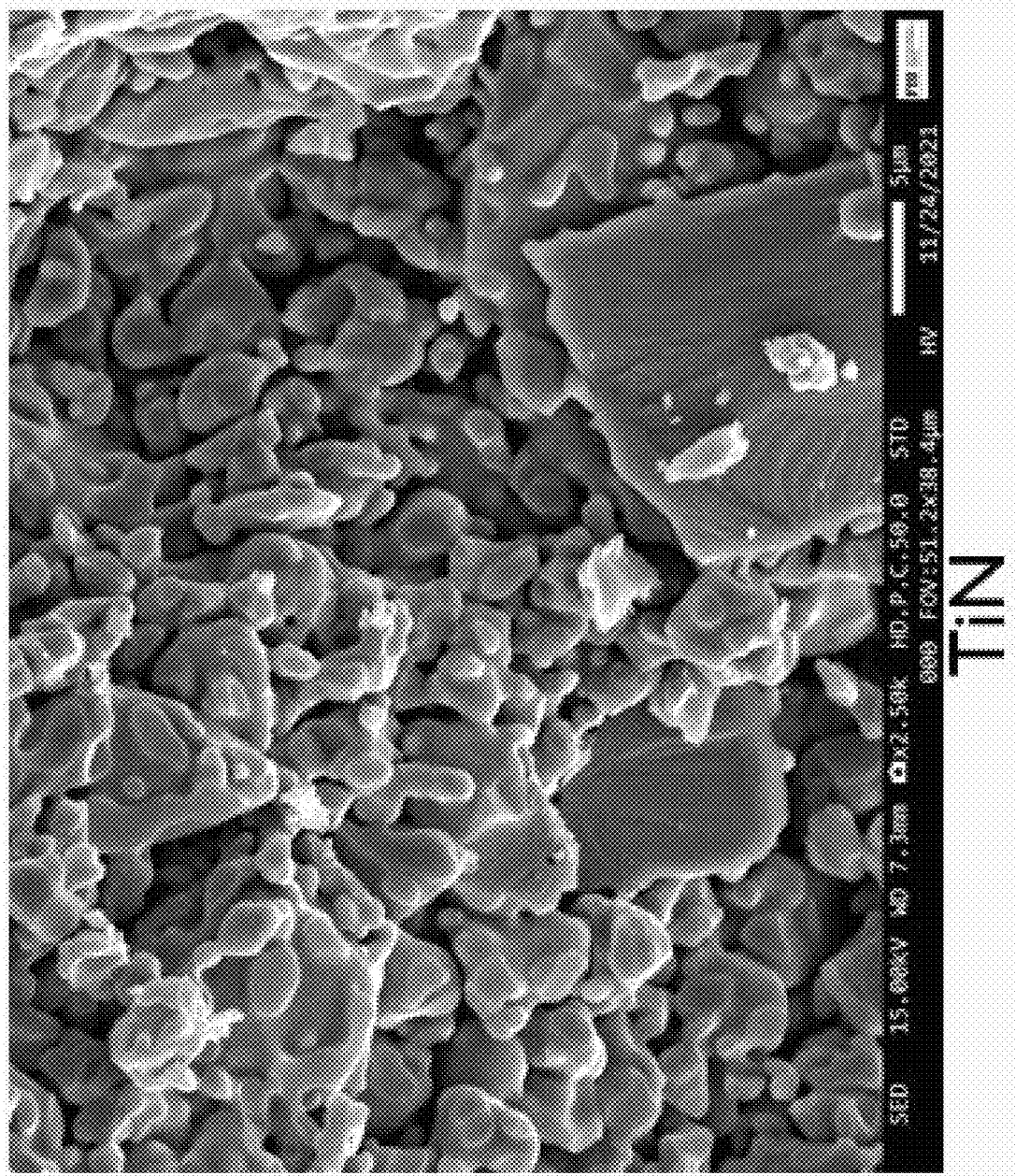
FIG. 11D is an SEM image of a fractured surface of flash sintered TiN according to an embodiment of the subject invention.
Figure 11E:
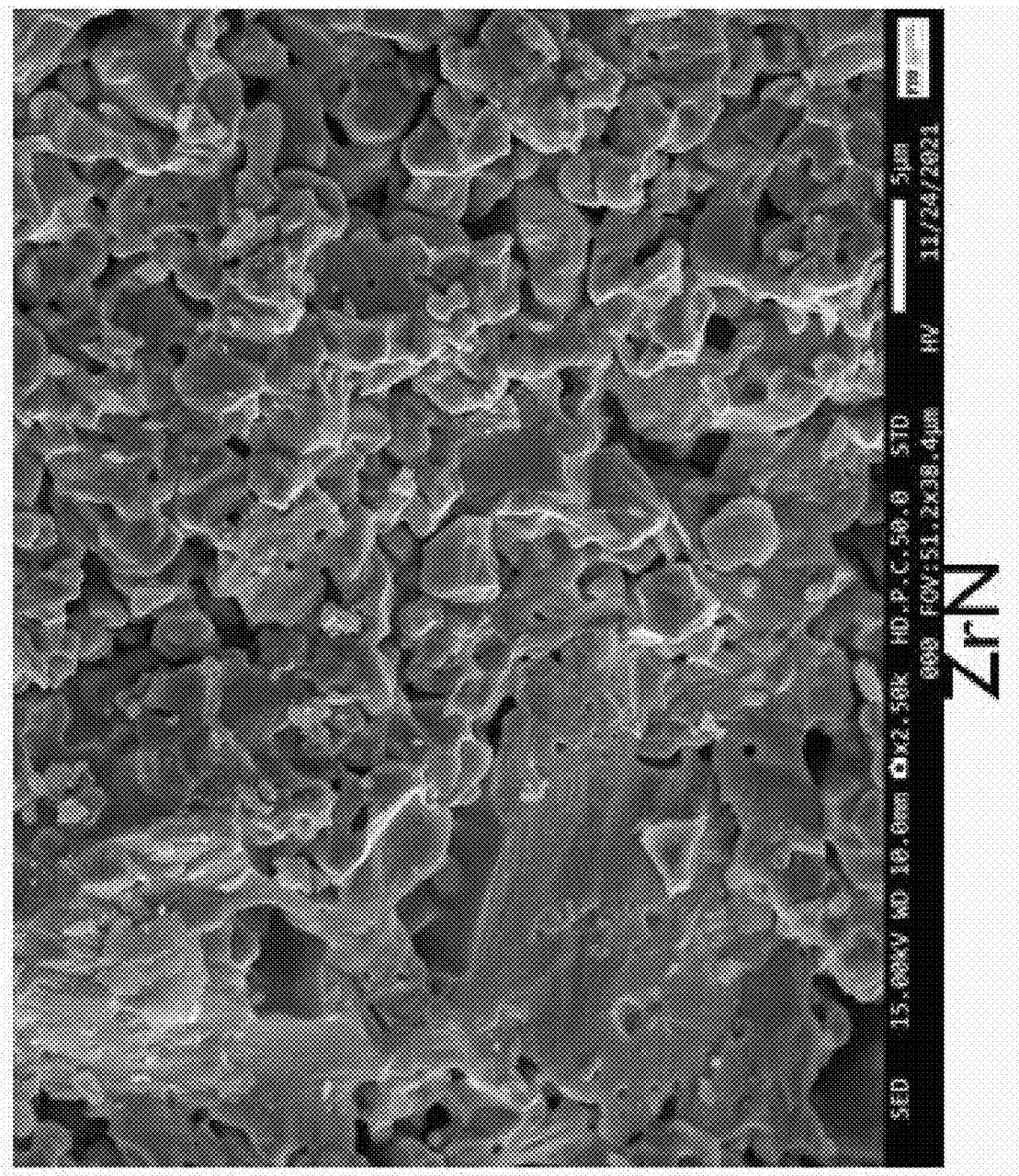
FIG. 11E is an SEM image of a fractured surface of flash sintered ZrN according to an embodiment of the subject invention.
Figure 12A:
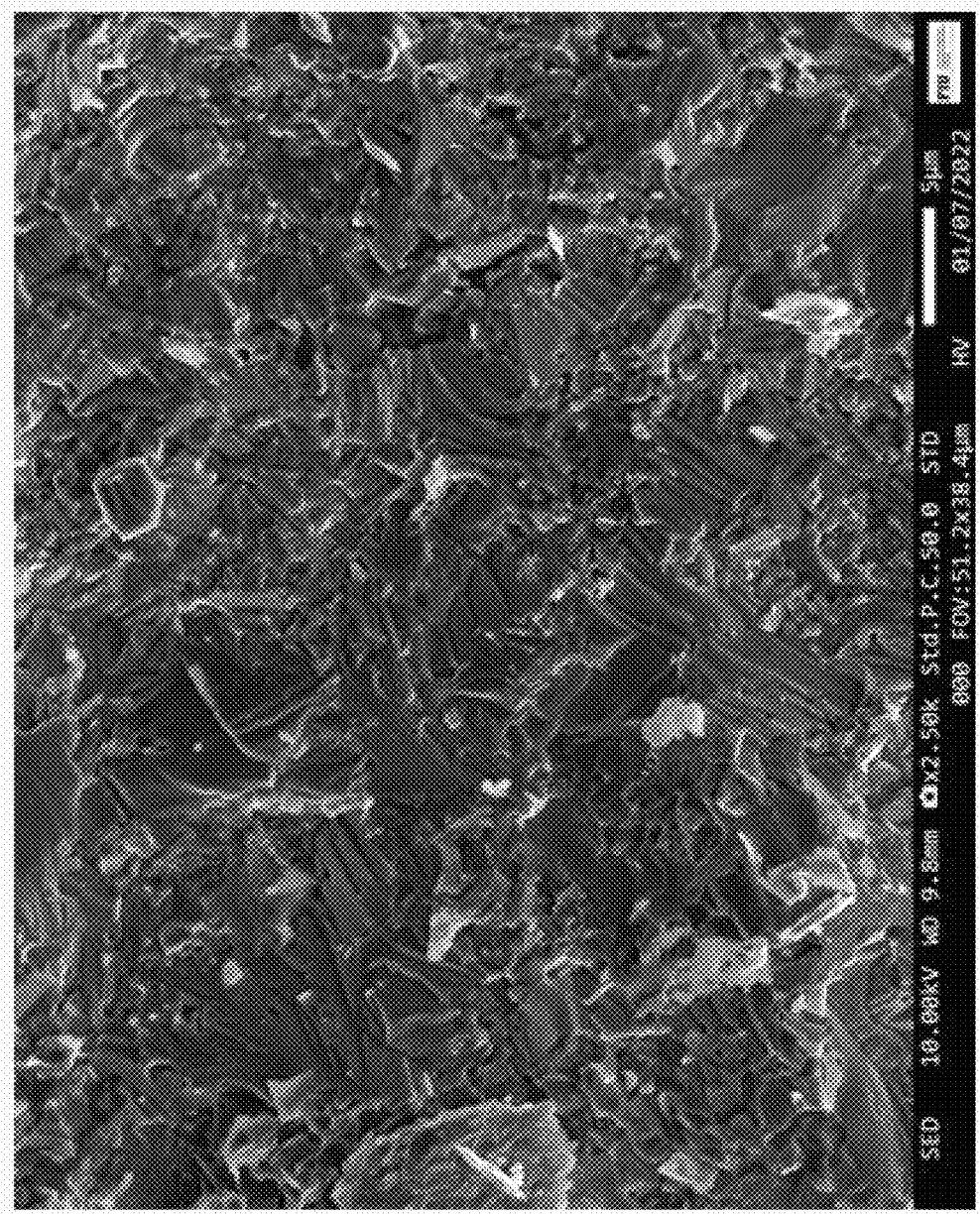
FIG. 12A is an SEM image of a fractured surface of flash sintered 5MN (AlN, NbN, TaN, TiN, ZrN) according to an embodiment of the subject invention.
Figure 12B:
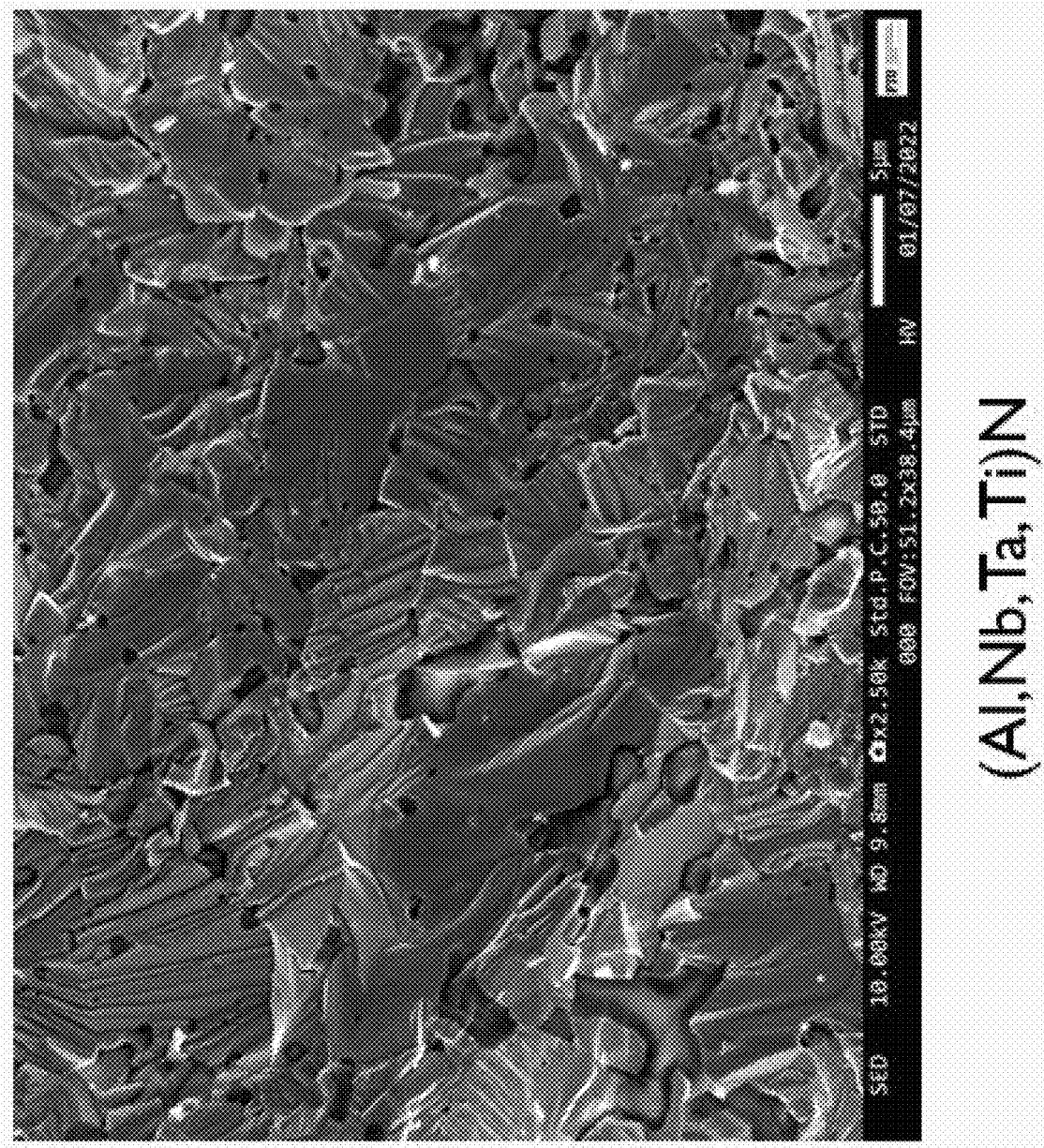
FIG. 12B is an SEM image of a fractured surface of flash sintered 4MN (AlN, NbN, TaN, TiN) according to an embodiment of the subject invention.
Figure 12C:
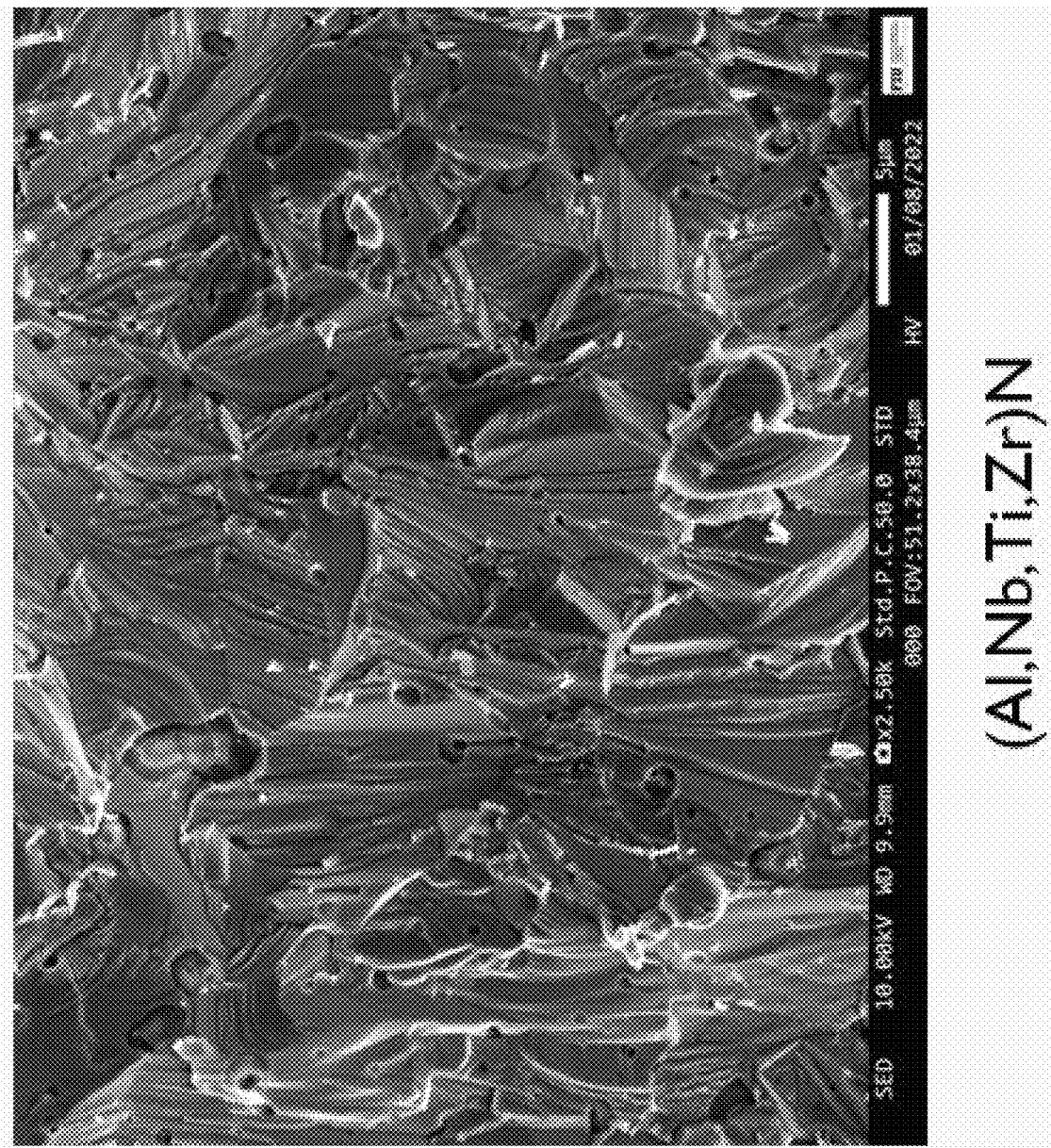
FIG. 12C is an SEM image of a fractured surface of flash sintered 4MN (AlN, NbN, TiN, ZrN) according to an embodiment of the subject invention.

SEM images of the three cross-sections in FIGS. 3A-3C, respectively, show the flash sintered samples are quite dense. It is noted that the sample is not completely uniform, with some areas containing more pores and some other regions were very dense. EDX mapping shows that all elements are distributed randomly as seen in FIGS. 4A-4E, respectively. It is interesting to observe the fractured surfaces of all three high entropy nitride samples contain layered structures. While not being bound by theory, the inventors hypothesize that these layered structures result from many slip lines in the flash sintered samples.

The Vickers hardness and fracture toughness of the three high entropy nitrides as well as the corresponding binary nitrides (also fabricated by flash sintering technique) have been measured using Vickers microhardness and SEM micrographs. The binary nitrides were also synthesized by flash sintering under similar sintering conditions. Table 1 contains the Vickers hardness and Table 2 contains the fracture toughness ($K_{1c}$) values for flash sintered binary nitrides and high entropy nitrides. $K_{1c}$ values for flash sintered binary nitrides are comparable to literature (e.g., Alexandre N, et al. Mechanical properties of hot isostatically pressed zirconium nitride materials. *J Mater Sci.* 1993; 28(9):2385-2390. https://doi.org/10.1007/BF01151669; Bourguille J, et al. Vickers microhardness and indentation fracture toughness of tantalum sesquinitride, η-Ta2N3. *Ceram Int.* 2016; 42(1):982-985. https://doi.org/10.1016/j.ceramint.2015.08.130; Mei Z G, et al. First-principles study of fracture toughness enhancement in transition metal nitrides. *Surf Coatings Technol.* 2019; 357(October 2018): 903-909. https://doi.org/10.1016fj.surfcoat.2018.10.102; and Russias J, et al. Bulk titanium nitride material obtained from SHS starting powder: Densification, mechanical characterization and tribological approach. *Int J Refract Met Hard Mater.* 2005; 23(4-6 SPEC. ISS.):344-349. https://doi.org/10.1016/j.ijrmhm.2005.05.013; each of which is respectively hereby incorporated by reference in its entirety, including all figures and tables, to the extent they are not inconsistent with the explicit teachings of this specification).

For the tested samples, the hardness increased slightly, but fracture toughness $K_{1c}$ increases significantly. For example, HEN03 $(Al_{0.20}Nb_{0.20}Ti_{0.40}Zr_{0.20})N$ shows a high $K_{1c}$ value of 9.09 f 2.29 MPa m$^{1/2}$, which is almost four times of its constituent binary nitrides NbN and TiN. HEN01 $(Al_{0.17}Nb_{0.17}Ta_{0.17}Ti_{0.32}Zr_{0.17})N$ and HEN02 $(Al_{0.20}Nb_{0.20}Ta_{0.20}Ti_{0.40})N$ also shows high $K_{1c}$ value of 8.06 f 2.05 MPa m$^{1/2}$ and 8.22±3.01 MPa m$^{1/2}$ respectively. While not being bound by theory, the enhanced fracture toughness and/or better resistance to crack propagation is hypothesized by the inventors as attributed to the layered structure and the closely spaced slip lines, as seen in FIGS. 3A-3C. Such layered cross-section is not observed for binary nitrides prepared by flash sintering under similar conditions.

TABLE 1

| Vickers hardness. | |
|---|---|
| Compound | Vickers Hardness (GPa) |
| (Al, Nb, Ta, Ti, Zr)N | 16.65 ± 1.74 |
| (Al, Nb, Ta, Ti)N | 18 ± 0.41 |
| (Al, Nb, Ti, Zr)N | 19.06 ± 0.62 |
| NbN | 15.74 ± 0.61 |
| TaN | 12.48 ± 0.4 |

TABLE 1-continued

Vickers hardness.

| Compound | Vickers Hardness (GPa) |
|---|---|
| TiN | 8.005 ± 1.47 |
| ZrN | 14.2 ± 0.9 |

TABLE 2

Fracture toughness.

| Compound | Fracture Toughness (MPa·m$^{1/2}$) |
|---|---|
| $(Al_{0.17}Nb_{0.17}Ta_{0.17}Ti_{0.32}Zr_{0.17})N$ | 8.06 ± 2.05 |
| $(Al_{0.20}Nb_{0.20}Ta_{0.20}Ti_{0.40})N$ | 8.22 ± 3.01 |
| $(Al_{0.20}Nb_{0.20}Ti_{0.40}Zr_{0.20})N$ | 9.09 ± 2.29 |
| NbN | 2.81 ± 0.81 |
| TaN | 4.03 ± 1.69 |
| TiN | 2.2 ± 0.85 |
| ZrN | 4.6 ± 0.6 |

DISCUSSION

High entropy nitrides have been successfully fabricated by reaction flash sintered using a proprietary flash sintering apparatus, according to certain embodiments of the subject invention. While not being bound by theory, multiple elements at the cationic sublattice are believed by the inventors to increase the configuration entropy of the system and form single phase solid solutions. Improvement to one or more mechanical properties (e.g., fracture toughness) was observed for the HEN compared with the constituent binary nitrides. Embodiment of the subject invention are expected to be useful in applications including bulk structural materials and coatings.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A sintered high entropy nitride (HEN) ceramic, comprising $(Al_aNb_aTa_xTi_yZr_z)N$, where a is at least 0.17, x is either 0 or at least 0.17, y is at least 0.16, z is either 0 or at least about 0.17, and 2a+x+y+z is equal to 1.

2. The sintered HEN ceramic according to claim 1, where y is equal to about twice a.

3. The sintered HEN ceramic according to claim 2, where x and z are each, respectively, equal to a.

4. The sintered HEN ceramic according to claim 2, where x is 0.

5. The sintered HEN ceramic according to claim 2, where z is 0.

6. The sintered HEN ceramic according to claim 4, where z equals a.

7. The sintered HEN ceramic according to claim 5, where x equals a.

8. The sintered HEN ceramic according to claim 6, where y equals 0.40.

9. The sintered HEN ceramic according to claim 7, where y equals 0.40.

10. The sintered HEN ceramic according to claim 8, exhibiting a Vickers Hardness of at least 18 gigapascals (GPa) and a fracture toughness of at least 9 megapascal meters$^{(1/2)}$ (MPa*m$^{(1/2)}$).

11. A method for synthesizing a sintered high entropy nitride (HEN) ceramic, the method comprising:
    providing a powder comprising $(Al_aNb_aTa_xTi_yZr_z)N$, where a is at least 0.17, x is either 0 or at least 0.17, y is at least 0.16, and z is either 0 or at least about 0.17;
    mixing the powder in an equimolar or near-equimolar ratio to form a reaction mixture where 2a+x+y+z is equal to 1;
    cold-pressing the reaction mixture at a cold-pressing pressure to form a green pellet;
    inserting the green pellet into an insulating tube;
    simultaneously applying a direct current (DC) voltage and a sintering pressure to the green pellet within the insulating tube, the DC voltage and the sintering pressure together being sufficient to flash sinter the green pellet, thus synthesizing the sintered HEN ceramic;
    removing the DC voltage and the sintering pressure;
    allowing the sintered HEN ceramic to cool to about ambient temperature; and
    removing the sintered HEN ceramic from the insulating tube.

12. The method according to claim 11, the cold-pressing being uniaxial.

13. The method according to claim 12, the cold-pressing pressure being about 2400 MPa.

14. The method according to claim 13, the DC voltage sufficient to produce a DC electrical field of about 80 volts per centimeter (V/cm) across the green pellet.

15. The method according to claim 14, the sintering pressure being about 14 MPa.

16. The method according to claim 15, the sintered HEN ceramic comprising $(Al_aNb_aTa_xTi_yZr_z)N$, where a is 0.17, x is 0.17, y is 0.32, and z is 0.17.

17. The method according to claim 15, the sintered HEN ceramic comprising $(Al_aNb_aTa_xTi_y)N$, where a is 0.20, x is 0.20, and y is 0.40.

18. The method according to claim 15, the sintered HEN ceramic comprising $(Al_aNb_aTi_yZr_z)N$, where a is 0.20, y is 0.40, and z is 0.20.

19. A sintered high entropy nitride (HEN) ceramic, comprising $(Al_aNb_aTi_yZr_z)N$, where a is 0.20, y is 0.40, and z is 0.20.

20. The sintered HEN ceramic according to claim 19, exhibiting a Vickers Hardness of at least 19 gigapascals (GPa) and a fracture toughness of at least 9 megapascal meters$^{(1/2)}$ (MPa*m$^{(1/2)}$).

* * * * *